United States Patent
Ghanwani et al.

(10) Patent No.: US 12,432,155 B2
(45) Date of Patent: Sep. 30, 2025

(54) BUFFER HEADROOM-BASED RESULT DETERMINATION SYSTEM

(71) Applicant: Dell Products L.P., Round Rock, TX (US)

(72) Inventors: Anoop Ghanwani, Roseville, CA (US); Raja Sathianarayan Jayakumar, Fremont, CA (US); Claudio DeSanti, Santa Cruz, CA (US)

(73) Assignee: Dell Products L.P., Round Rock, TX (US)

( * ) Notice: Subject to any disclaimer, the term of this patent is extended or adjusted under 35 U.S.C. 154(b) by 461 days.

(21) Appl. No.: 18/099,863

(22) Filed: Jan. 20, 2023

(65) Prior Publication Data

US 2024/0250912 A1    Jul. 25, 2024

(51) Int. Cl.
*H04L 47/30* (2022.01)
*H04L 43/50* (2022.01)
*H04L 47/36* (2022.01)

(52) U.S. Cl.
CPC ............. *H04L 47/30* (2013.01); *H04L 43/50* (2013.01); *H04L 47/36* (2013.01)

(58) Field of Classification Search
CPC ......... H04L 47/30; H04L 43/50; H04L 47/36; H04L 43/0894; H04L 43/16
See application file for complete search history.

(56) References Cited

U.S. PATENT DOCUMENTS

| | | | |
|---|---|---|---|
| 2007/0104102 A1* | 5/2007 | Opsasnick | H04L 47/2441 370/412 |
| 2013/0250762 A1* | 9/2013 | Assarpour | H04L 47/266 370/235 |
| 2016/0344636 A1* | 11/2016 | Elias | H04L 47/2441 |
| 2017/0279741 A1* | 9/2017 | Elias | H04L 43/16 |

OTHER PUBLICATIONS

SONiC, "Dynamically Headroom Calculation," SONiC/dynamically-headroom-calculation.md at master •sonic-net/SONiC—GitHub, 37 pages, retrieved on Jan. 19, 2023, retrieved from https://github.com/sonic-net/SONiC/blob/master/doc/qos/dynamically-headroom-calculation.md.

(Continued)

*Primary Examiner* — Habte Mered
(74) *Attorney, Agent, or Firm* — Joseph Mencher

(57) ABSTRACT

A headroom-based result determination system includes first and second ports connected via a link, and a buffer for the first port. A headroom-based result determination subsystem monitors data stored in the buffer that was received in data packets each having a worst-case data packet size and transmitted at a maximum packet rate for a link speed of the link, determines that a buffer threshold is reached and, in response, generates a pause instruction. The headroom-based result determination subsystem then transmits the pause instruction to the second port, measures a first amount of data stored in the buffer subsequent to generating the pause instruction, and generates a headroom-based result by adding the first amount of data, a second amount of data equal to a maximum transmission size of the first port, and (Continued)

a third amount of data equal to a maximum transmission size of a class of the data received at the first port.

20 Claims, 27 Drawing Sheets

(56) References Cited

OTHER PUBLICATIONS

Lily LV et al., "PFC Headroom Measurement and Calculation Project Proposal," 8 pages, IEEE 802 LMSC, available at https://1.ieee802.org/tsn/802-1qdt/.
Lily LV et al., "P802.1Qdt Status Update and New Proposal Discussion," 17 pages, IEEE available at https://1.ieee802.org/tsn/802-1qdt/.
IEEE, "P802.1Qdt/D0.2 Draft Standard for Local and metropolitan area networks-Bridges and Bridged Networks—Amendment: Priority-based Flow Control Enhancements," (Amendment to IEEE Std 802.1Q™-2022 as amended by EEE Std 802.1 Qcz™-2022), Sep. 15, 2022, 148 pages.

* cited by examiner

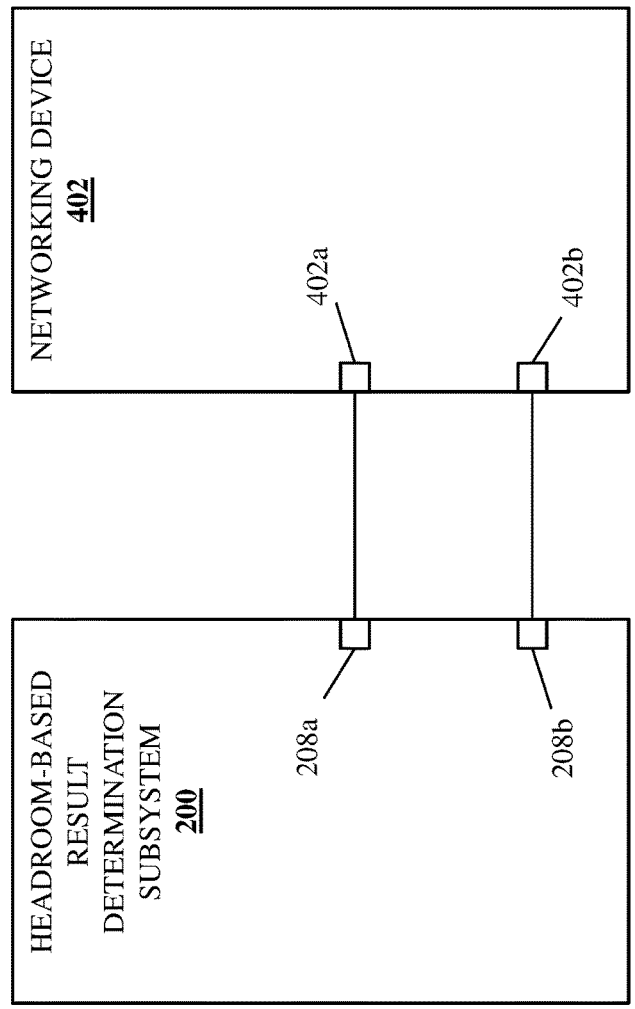

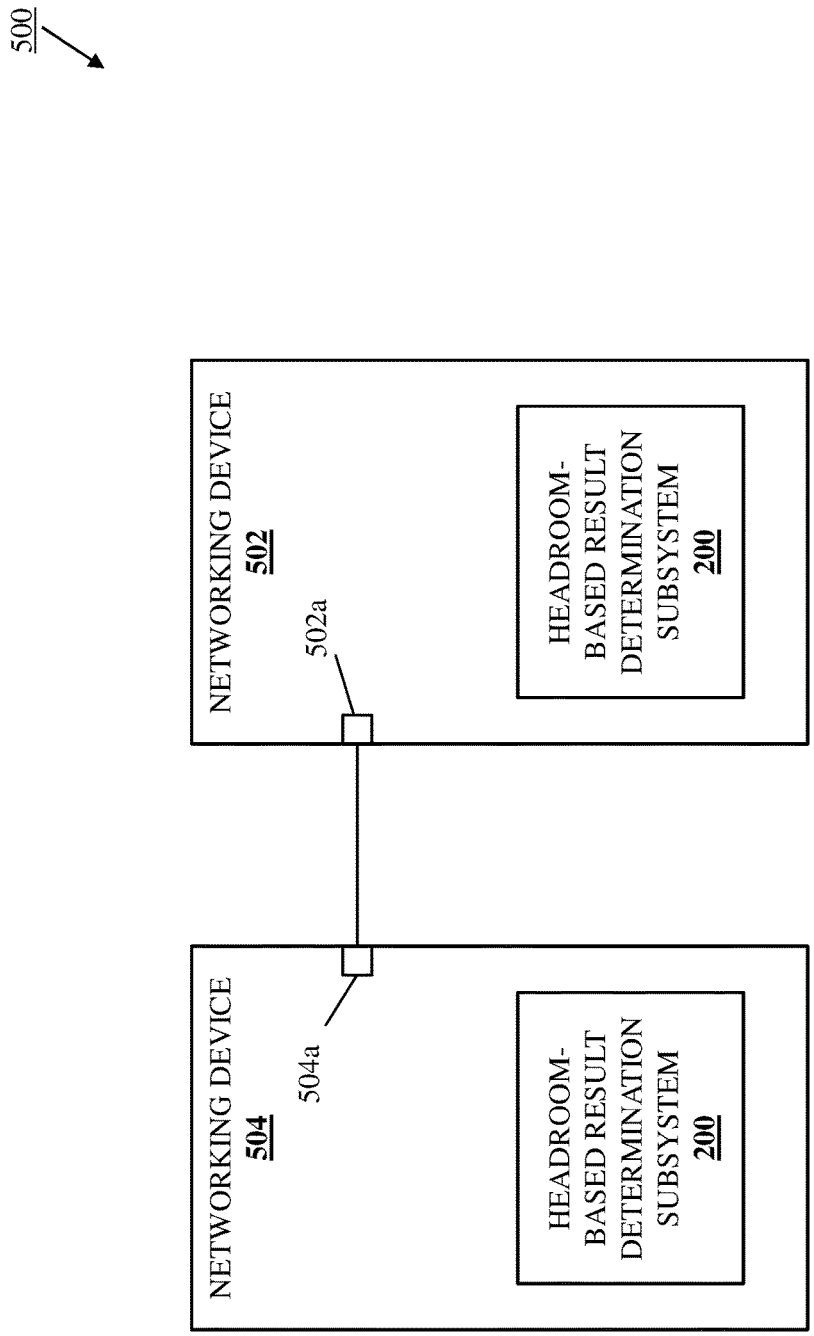

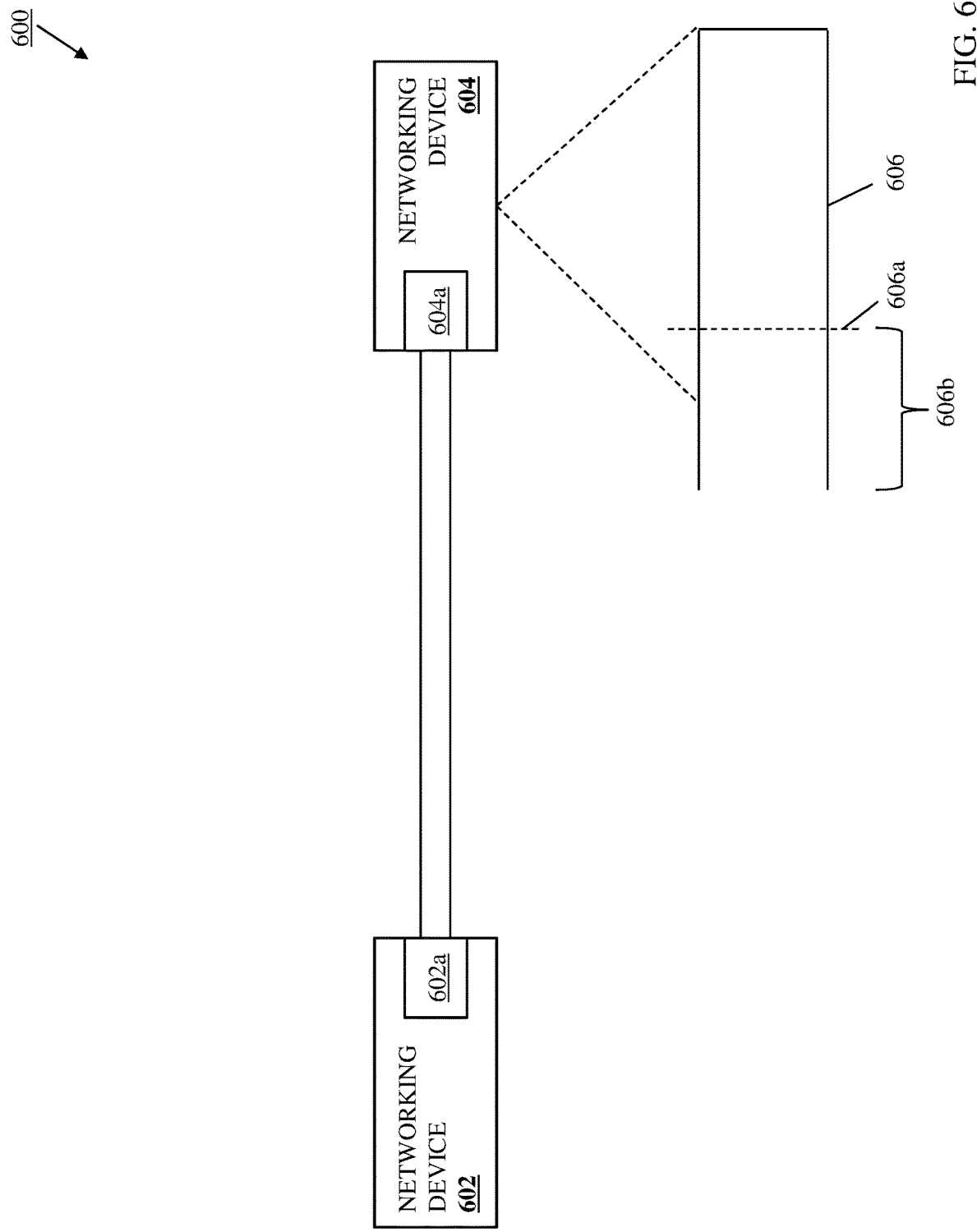

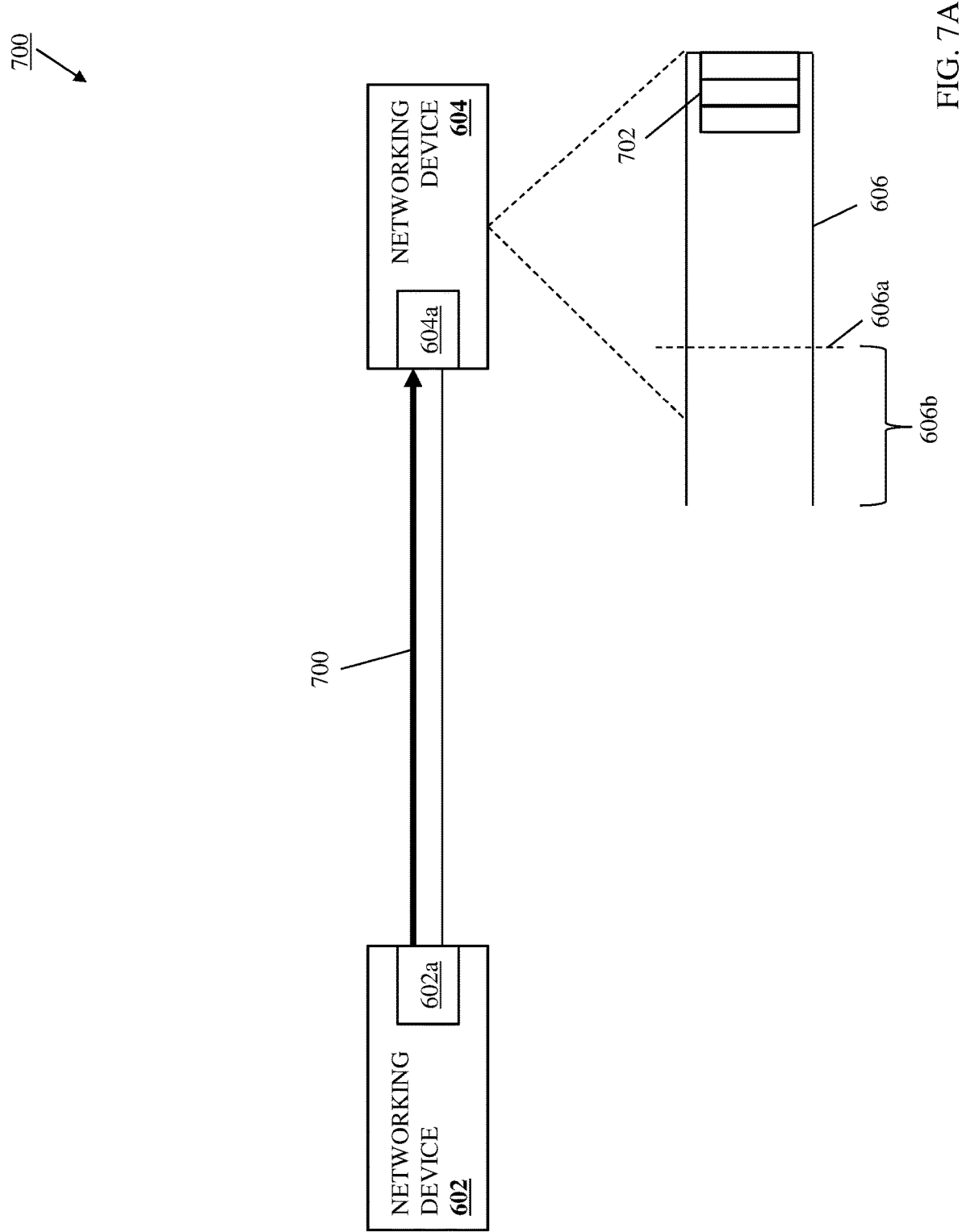

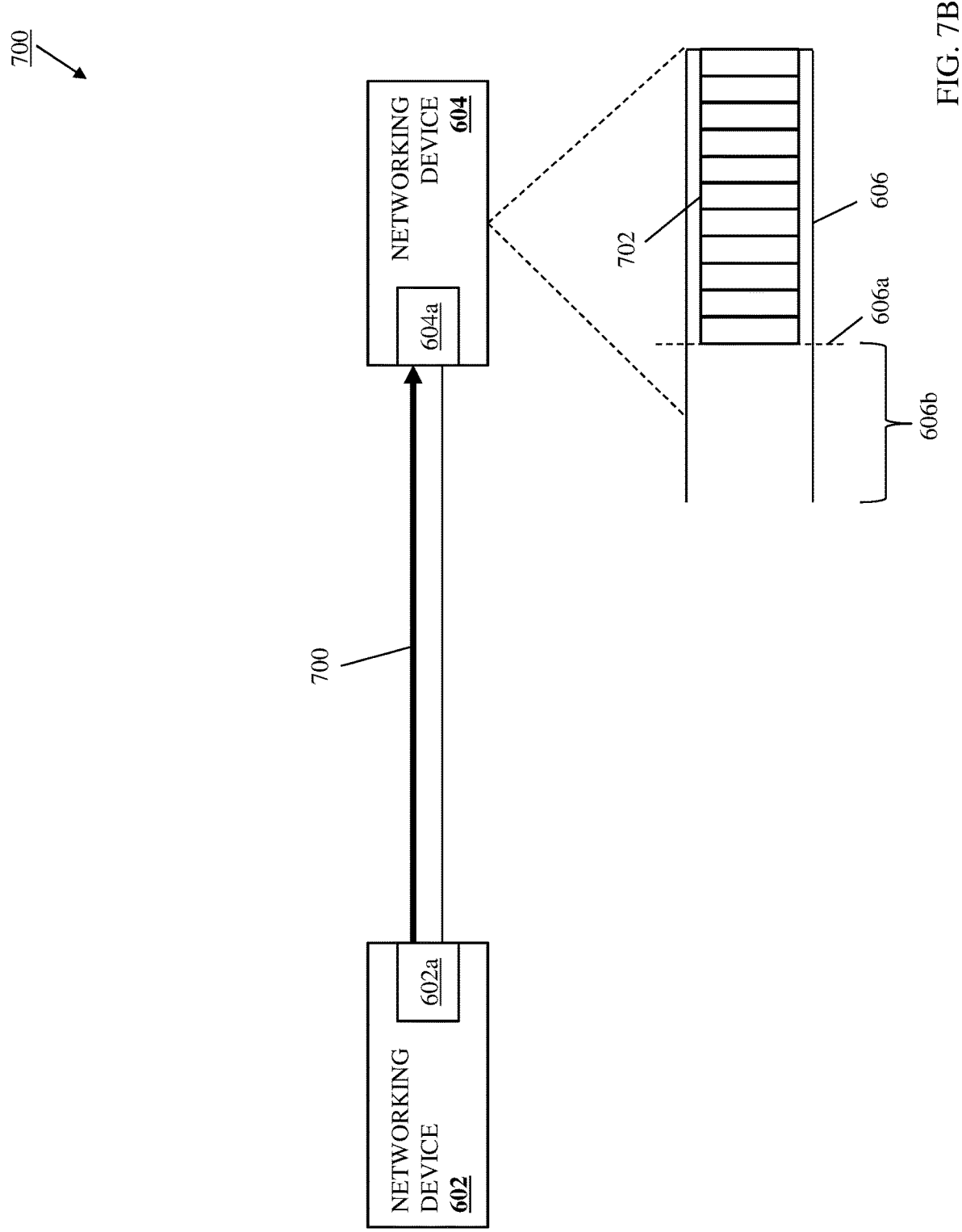

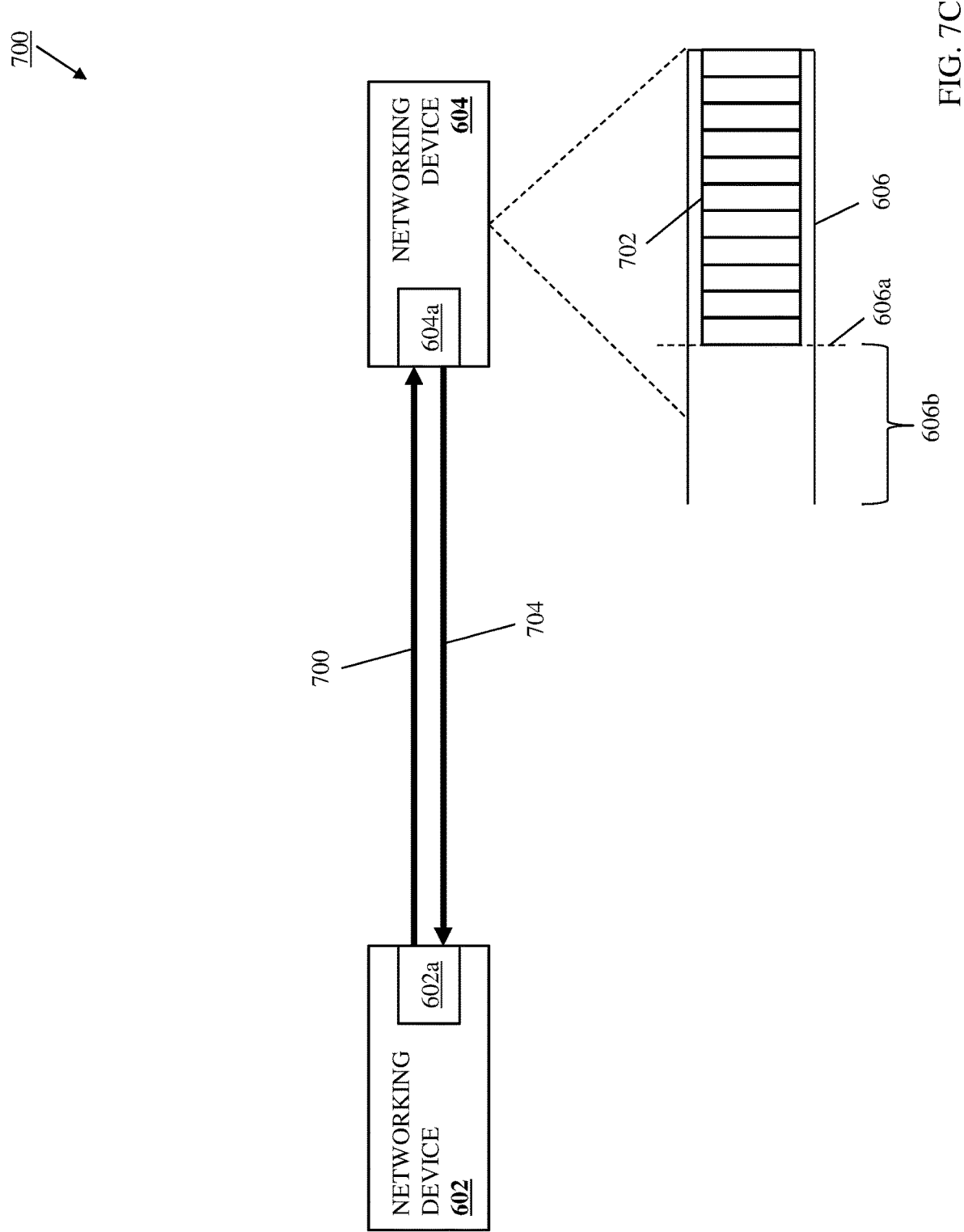

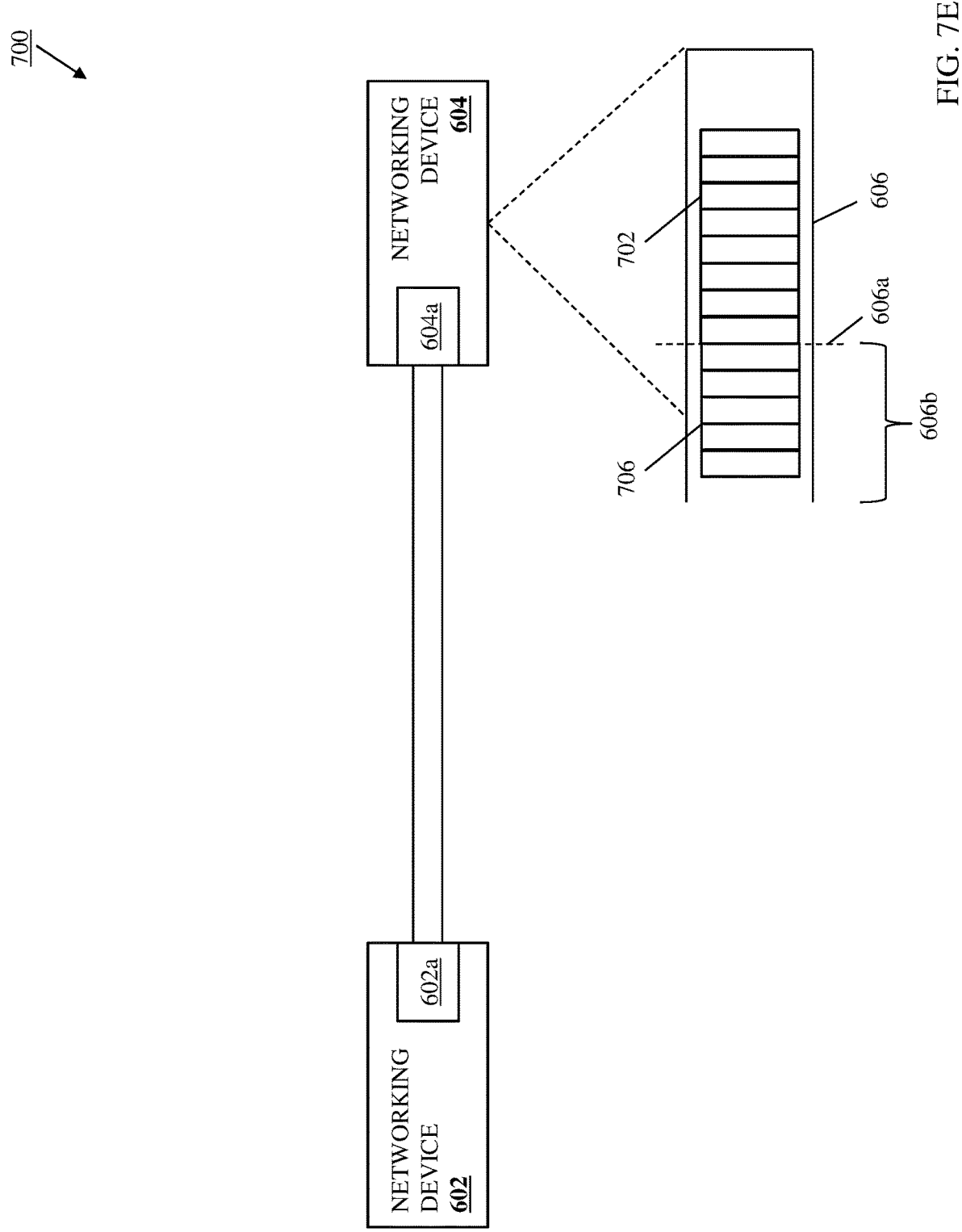

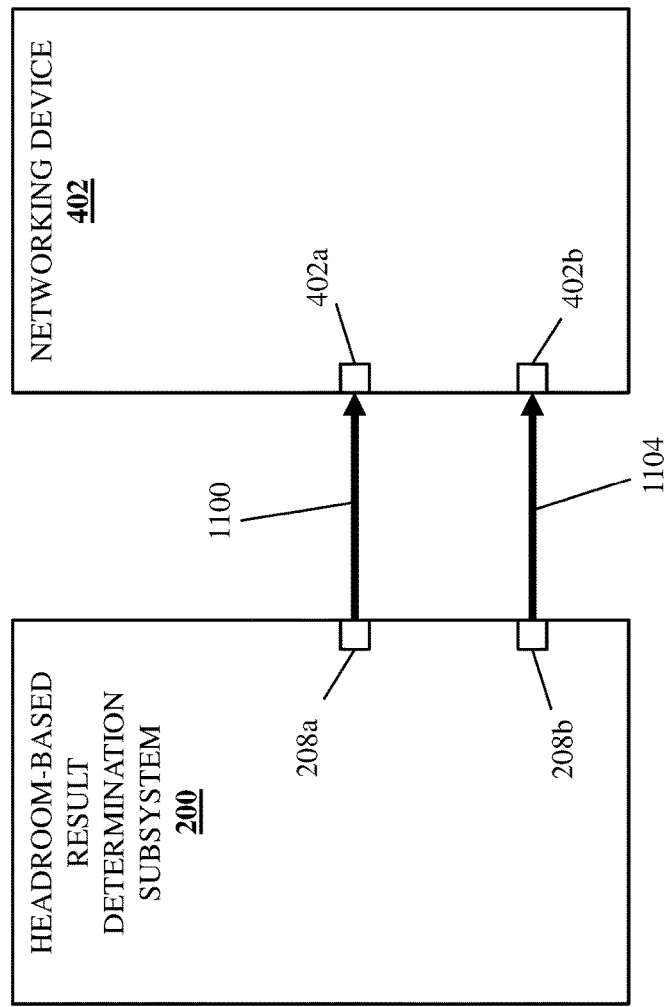

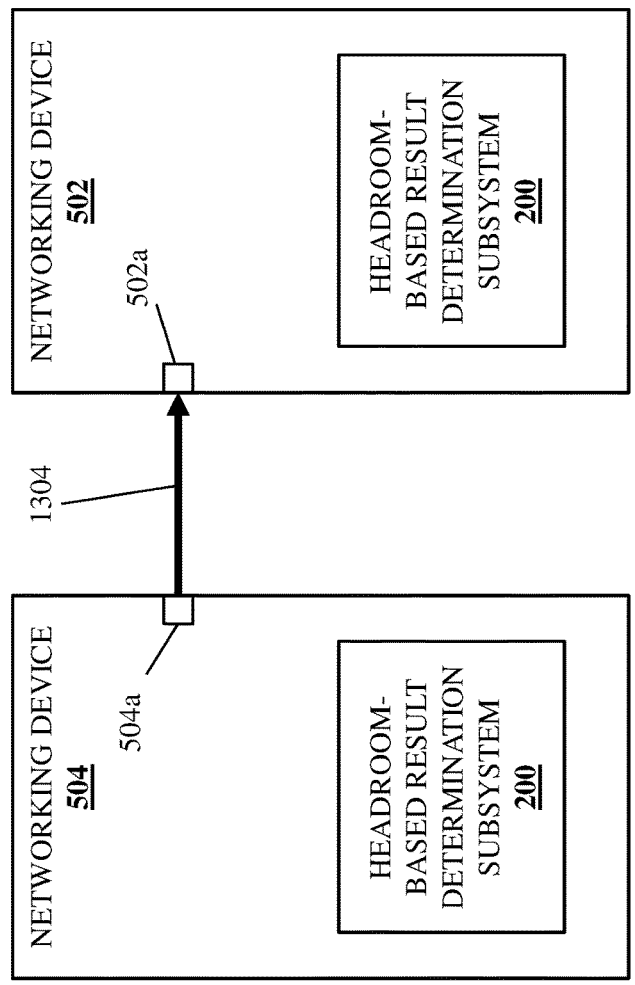

BUFFER HEADROOM-BASED RESULT DETERMINATION SYSTEM

BACKGROUND

The present disclosure relates generally to information handling systems, and more particularly to determining buffer headroom-based results related to the headroom within a buffer for a port on an information handling system that is used to receive data communications.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, networking devices, are sometimes used to transmit lossless data communications such as lossless Ethernet data communications utilized in communication protocols such as the Fiber Channel over Ethernet (FCoE) protocol, the Remote Direct Memory Access (RDMA) over Converged Ethernet (RoCE) protocol, the internet Small Computer Systems Interface (iSCSI) protocol, the iWARP protocol, and/or other lossless Ethernet data communications protocols known in the art. As will be appreciated by one of skill in the art in possession of the present disclosure, such lossless Ethernet data communications utilize Ethernet flow control techniques such as pause frames provided according to the Institute of Electrical and Electronics Engineers (IEEE) 802.3x standards that treat all data traffic as lossless, or Priority-based Flow Control (PFC) according to the IEEE 802.1Qbb standards that treat certain classes of data traffic as lossless.

The lossless Ethernet data communications discussed above operate when a networking device experiences congestion and must buffer data packets including lossless class data. For example, a port on a networking device may receive data communications from a data transmission device, and may include a buffer in which the data in those data communications may be stored before being forwarded by that networking device. For the purposes of the Ethernet flow control discussed above, a threshold may be defined in that buffer, and in the event the data stored in the buffer reaches that threshold (e.g., during the congestion situation discussed above), the networking device will generate pause frames (e.g., via a Media Access Control (MAC) layer) or PFC frames (e.g., via a higher layer than the MAC layer) and transmit the pause frame or PFC frame when the link is available to instruct the data transmission device to pause the data communications being transmitted to the port on the networking device. However, the data communications from the data transmission device are not paused the instant the pause frame or PFC frame is generated, and rather will continue to be transmitted until the data transmission device receives and acts on the pause frame or PFC frame. As will be appreciated by one of skill in the art in possession of the present disclosure, between the time the pause frame or PFC frame is generated and the time the data transmission device receives and acts on the pause frame or PFC frame, data communications will continue to be received by the networking device and their data stored in the buffer. As such, a space in the buffer called the "headroom" must be set aside to accommodate the data that may be received after the data stored in the buffer reaches the threshold (i.e., the data received in the data communications subsequent to the generation of the pause frame or PFC frame).

As a general concept, the headroom within the buffer should be greater than 1) the sum of the delay introduced by the link between the data transmission device and the port on the networking device, and the delay introduced by interfaces in the data transmission device, the data transmission medium, and the networking device, 2) with that sum multiplied by a bandwidth of the link between the data transmission device and the port on the networking device, or:

$$\text{Headroom} > (\text{link delay} + \text{interface delay}) * \text{link bandwidth}$$

However, the actual determination of headroom is a complex process involving many variables, and requires tedious reference to relevant Media Access Control (MAC) and Physical Layer (PHY) specifications, while being error prone and resulting in values computed by device/subsystem vendors often not matching due to their use of different assumptions. Furthermore, such issues are exacerbated in non-standard use cases. For example, in a Data Center Interconnect (DCI) environment, cable lengths, non-standard data shapers, and/or other factors may need to be taken into consideration when computing headroom. As such, conventional headroom determinations tend to determine worst-case headroom requirements even when a corresponding implementation may require less headroom, which wastes memory/storage resources in the networking devices that are used to provide the buffer. Furthermore, such headroom determinations are often too difficult for network operators, end up being performed by the networking device provider that may have little information about the data communication configuration for the networking device (e.g., the actual cable lengths that are in use), and require the use of worst case assumptions (e.g. a maximum cable length expected to be used).

Accordingly, it would be desirable to provide a buffer headroom determination system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a headroom-based result determination engine that is configured to: monitor data stored in a buffer associated with a first port in response to the first port receiving, from a second port that is coupled to the first port via a link, the data in data packets that each have a worst-case data packet size and that are transmitted via the link at a maximum packet rate for a link speed of the link; determine that the data stored in the buffer has reached a buffer threshold and, in response, generate a data transmission pause instruction; transmit, through the first port and via the link, the data transmission pause instruction to the second port; measure a first amount of data that is received and stored in the buffer subsequent to generating the data transmission pause instruction; and generate a headroom-based result by adding the first amount of data, a second amount of data equal to a maximum data packet transmission size of the first port, and a third amount of data equal to a maximum data packet transmission size of a class of the data that is included in the data packets received at the first port.

BRIEF DESCRIPTION OF THE DRAWINGS

FIG. 4 is a schematic view illustrating an embodiment of a headroom-based result determination system that may include the headroom-based result determination subsystem of FIG. 2.

FIG. 5 is a schematic view illustrating an embodiment of a headroom-based result determination system that may include the headroom-based result determination subsystem of FIG. 2.

FIG. 6 is schematic view illustrating an embodiment of lossless data communication system.

FIG. 7A is a schematic view illustrating an embodiment of the operation of the lossless data communication system of FIG. 6.

FIG. 7B is a schematic view illustrating an embodiment of the operation of the lossless data communication system of FIG. 6.

FIG. 7C is a schematic view illustrating an embodiment of the operation of the lossless data communication system of FIG. 6.

FIG. 7E is a schematic view illustrating an embodiment of the operation of the lossless data communication system of FIG. 6.

FIG. 11C is a schematic view illustrating an embodiment of the headroom-based result determination system of FIG. 4 operating during the method of FIG. 10.

FIG. 13C is a schematic view illustrating an embodiment of the headroom-based result determination system of FIG. 5 operating during the method of FIG. 12.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
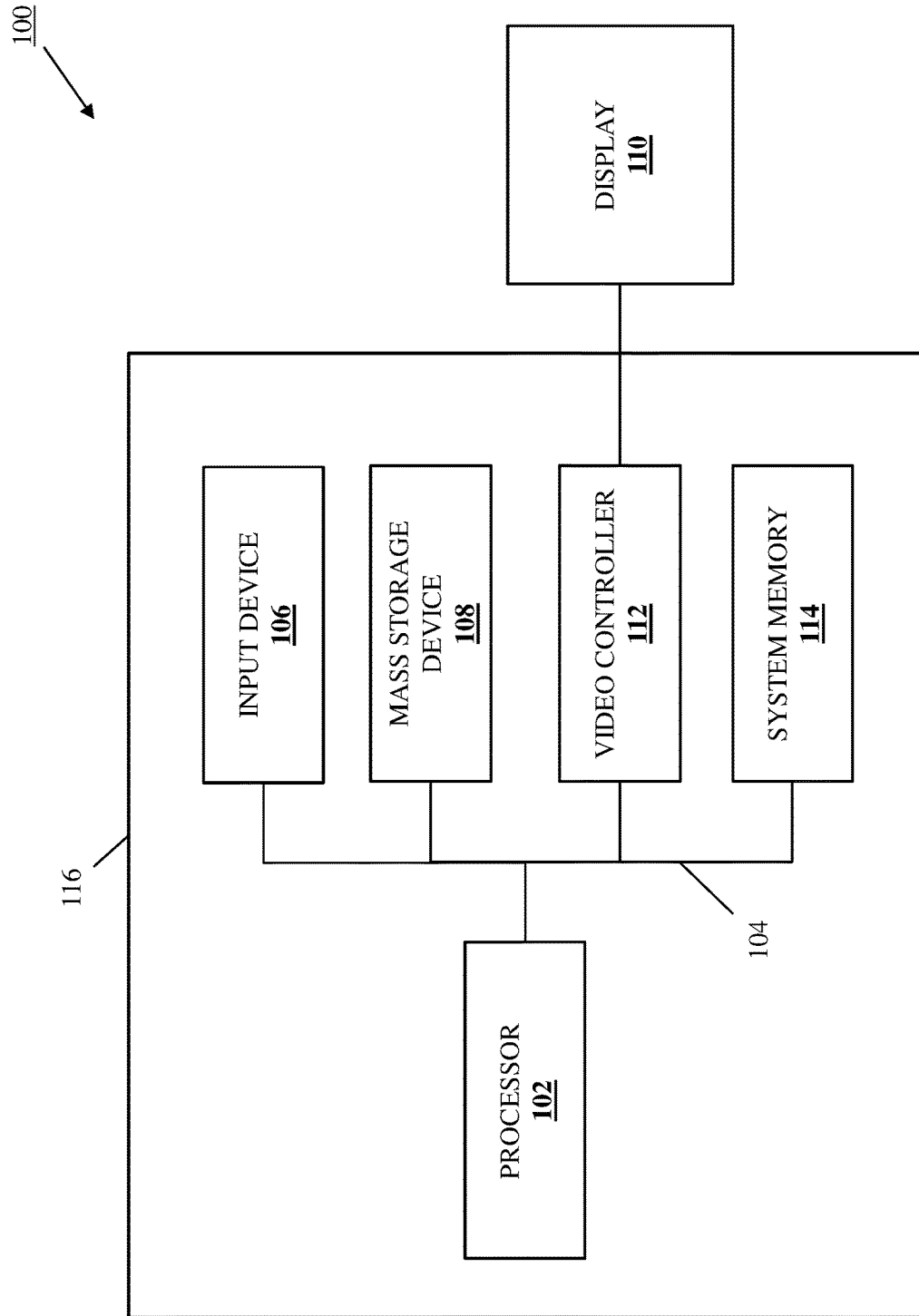
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
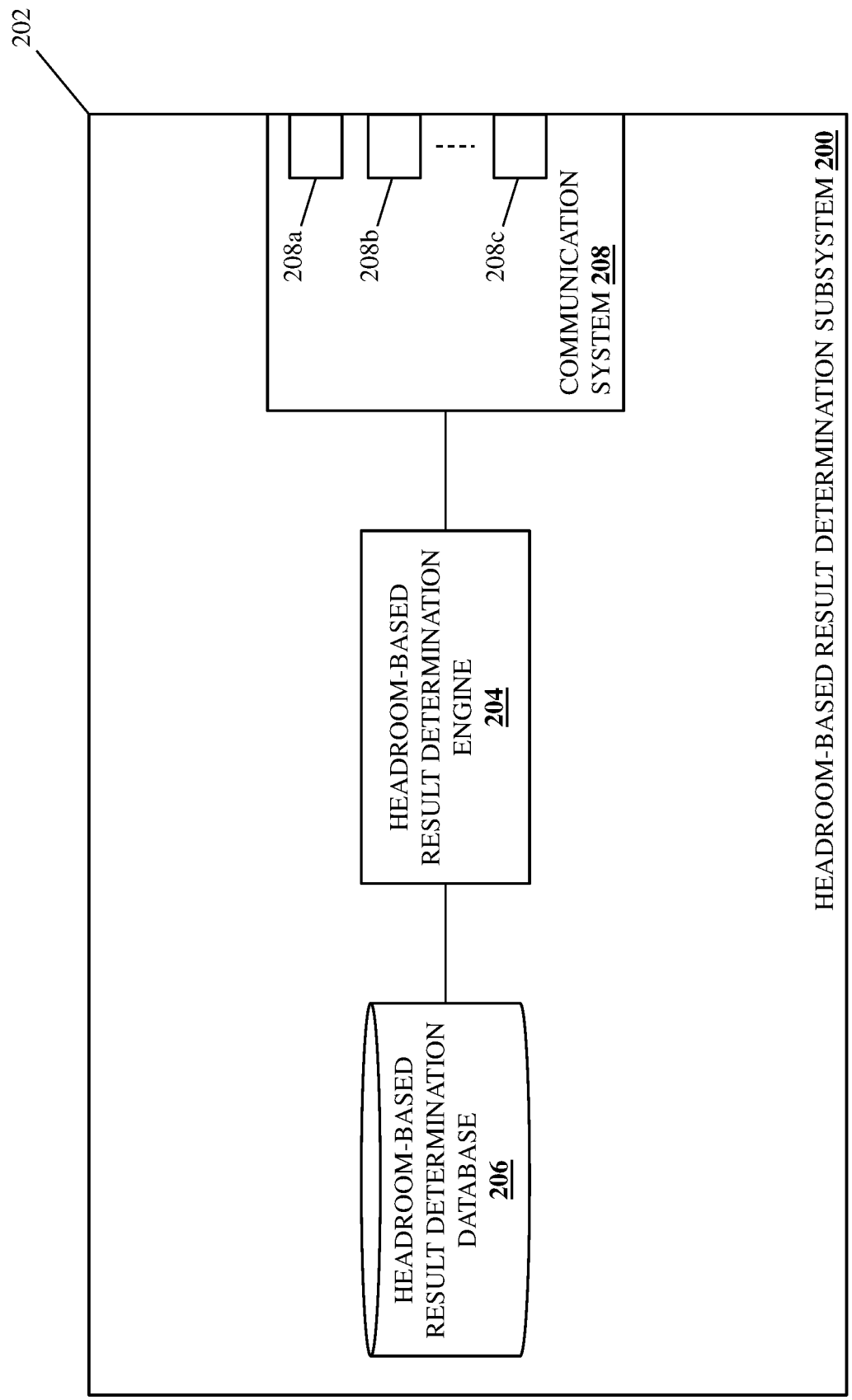
FIG. 2 is a schematic view illustrating an embodiment of a headroom-based result determination subsystem that may be used to provide the headroom-based result determination system of the present disclosure.

Referring now to FIG. 2, an embodiment of a headroom-based result determination subsystem 200 is illustrated that may be provided in the headroom-based result determination system of the present disclosure. As such, the headroom-based result determination subsystem 200 may be provided by the IHS 100 discussed above with reference to FIG. 1 and/or may include some or all of the components of the IHS 100, and in different examples may be provided as a "standalone" device, included in another device, and/or provided in a variety of manners that would be apparent to one of skill in the art in possession of the present disclosure. Furthermore, while illustrated and discussed as being provided in specific form-factors, one of skill in the art in possession of the present disclosure will recognize that the functionality of the headroom-based result determination subsystem 200 discussed below may be provided in and/or by other devices that are configured to operate similarly as the headroom-based result determination subsystem 200 discussed below.

In the illustrated embodiment, the headroom-based result determination subsystem 200 includes a chassis 202 that houses or supports the components of the headroom-based result determination subsystem 200, only some of which are illustrated and discussed below. For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a headroom-based result determination engine 204 that is configured to perform the functionality of the headroom-based result determination engines and/or headroom-based result determination subsystem 200 discussed below.

The chassis 202 may also house a storage system (not illustrated, but which may include the storage 108 discussed above with reference to FIG. 1) that is coupled to the headroom-based result determination engine 204 (e.g., via a coupling between the storage system and the processing system) and that includes a headroom-based result determination database 206 that is configured to store any of the information utilized by the headroom-based result determination engine 204 discussed below. The chassis 302 may also house a communication system 208 that is coupled to the headroom-based result determination engine 204 (e.g., via a coupling between the communication system 208 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. In the specific example illustrated in FIG. 2, the communication system 208 include a plurality of ports 208a, 208b, and up to 208c, although other communication system components will fall within the scope of the present disclosure as well. However, while a specific headroom-based result determination subsystem 200 has been illustrated and described, one of skill in the art in possession of the present disclosure will recognize that headroom-based result determination subsystems (or other devices operating according to the teachings of the present disclosure in a manner similar to that described below for the headroom-based result determination subsystem 200) may include a variety of components and/or component configurations for providing conventional functionality, as well as the functionality discussed below, while remaining within the scope of the present disclosure as well.

Figure 3:
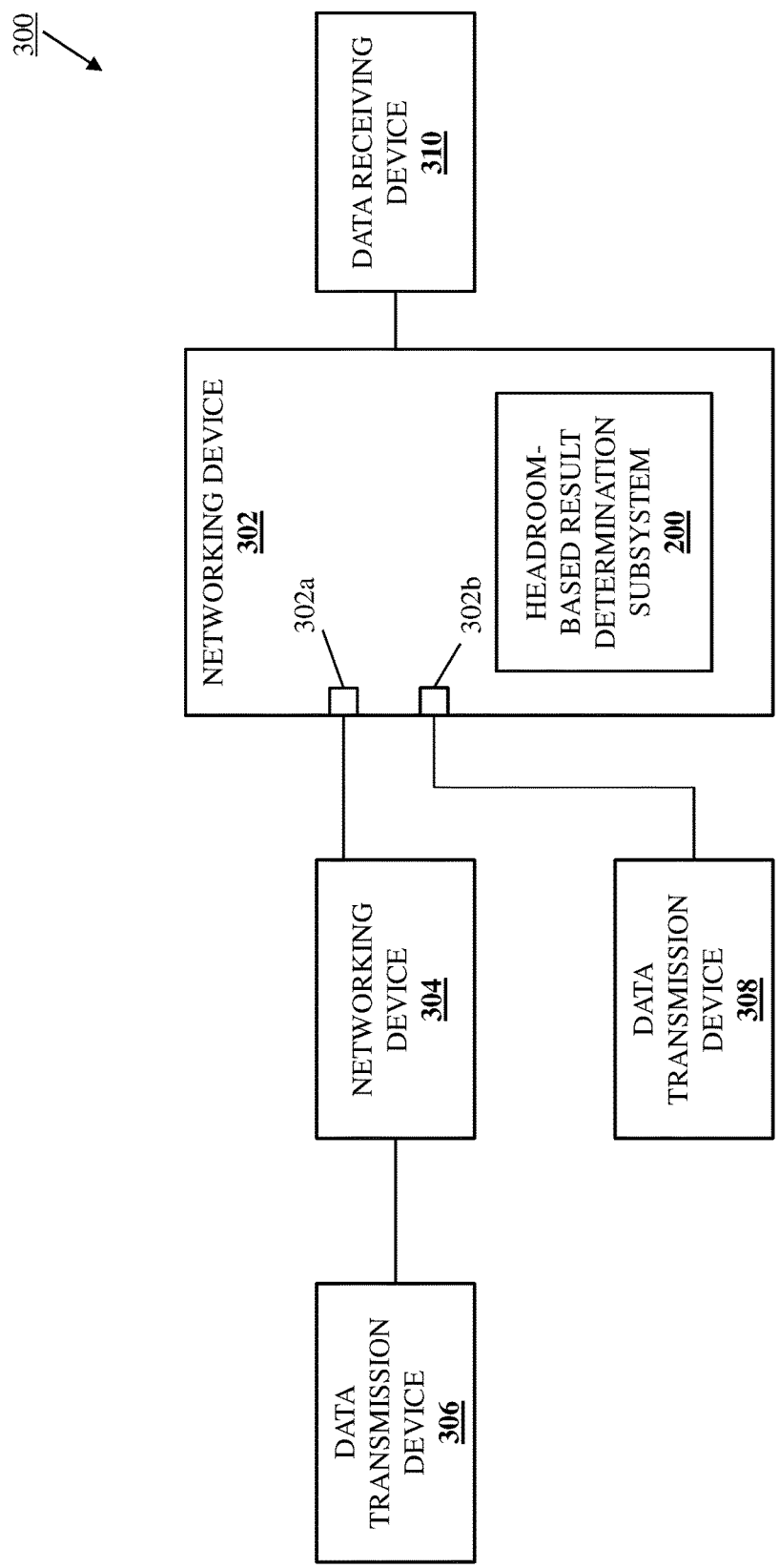
FIG. 3 is a schematic view illustrating an embodiment of a headroom-based result determination system that may include the headroom-based result determination subsystem of FIG. 2.

Referring now to FIG. 3, an embodiment of a headroom-based result determination system 300 is illustrated that may be provided according to the teachings of the present disclosure. In the illustrated embodiment, the headroom-based result determination system 300 includes a networking device 302. In an embodiment, the networking device 302 may be provided by the IHS 100 discussed above with reference to FIG. 1, and/or may include some or all of the components of the IHS 100, and in specific examples may be provided by a switch device. However, while illustrated and discussed as being provided by a switch device, one of skill in the art in possession of the present disclosure will recognize that networking devices provided in the headroom-based result determination system 300 may include any devices that may be configured to operate similarly as the networking device 302 discussed below.

As illustrated, the networking device 300 may include the headroom-based result determination subsystem 200 discussed above with reference to FIG. 2. As such, in some embodiments, a processing system, memory system, storage system, and communication system in a chassis of the networking device 302 may be configured to provide an integrated headroom-based result determination subsystem 200. Furthermore, in other embodiments, the headroom-based result determination subsystem 200 discussed above with reference to FIG. 2 may be provided in the chassis of the networking device 302 as a separate component (e.g., the chassis 202 of the headroom-based result determination subsystem 200 may be circuit board that may be coupled to components in the chassis of the networking device 302). However, while specific implementations of the headroom-based result determination subsystem 200 in the networking device 302 have been described, one of skill in the art in possession of the present disclosure will appreciate how the headroom-based result determination subsystem 200 may be provided in the networking device 302 in a variety of manners that will fall within the scope of the present disclosure as well.

In an embodiment, the networking device 302 includes a plurality of ports such as the ports 302a and 302b (e.g., Ethernet switch ports) illustrated in FIG. 3. In some embodiments, the ports 302a and 302b may be provided by any of the ports 208a-208c on the headroom-based result determination subsystem 200 discussed above with reference to FIG. 2 when, for example, the headroom-based result determination subsystem 200 is integrated in the networking device 302. In other embodiments, the ports 302a and 302b may be coupled to any of the ports 208a-208c on the headroom-based result determination subsystem 200 discussed above with reference to FIG. 2 when, for example, the headroom-based result determination subsystem 200 is provided as a separate component in the networking device 302. However, while a few specific examples of the coupling of the headroom-based result determination subsystem 200 in the networking device 302 to the ports 302a and 302b have been described, one of skill in the art in possession of the present disclosure will appreciate how the headroom-based result determination subsystem 200 may be coupled to the ports 302a and 302b in a variety of manners that will fall within the scope of the present disclosure.

In the illustrated embodiment, a networking device 304 is coupled to the port 302a on the networking device 302. In an embodiment, the networking device 304 may be provided by the IHS 100 discussed above with reference to FIG. 1, and/or may include some or all of the components of the IHS 100, and in specific examples may be provided by a switch device. However, while illustrated and discussed as being provided by a switch device, one of skill in the art in possession of the present disclosure will recognize that networking devices provided in the headroom-based result determination system 300 may include any devices that may be configured to operate similarly as the networking device 304 discussed below. Furthermore, a data transmission device 306 is coupled to the networking device 402. In an embodiment, the data transmission device 306 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that data transmission devices provided in the headroom-based result determination system 300 may include any devices that may be configured to operate similarly as the data transmission device 306 discussed below.

In the illustrated embodiment, a data transmission device 308 is coupled to the port 302b on the networking device 302. In an embodiment, the data transmission device 308 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that data transmission devices provided in the headroom-based result determination system 300 may include any devices that may be configured to operate similarly as the data transmission device 308 discussed below. Furthermore, while the data transmission device 308 is described below as transmitting data to generate congestion in the networking device 302, one of skill in the art in possession of the present disclosure will appreciate how such congestion may be generated in other manners (e.g., by having the port on the networking device 302 be lower speed than the port to which it is connected, by providing a data traffic shaper to transmit data to the networking device 302, etc.), and allowing the data transmission device 308 to be eliminated.

In the illustrated embodiment, a data receiving device 310 is coupled to the networking device 302. In an embodiment, the data receiving device 310 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that data receiving devices provided in the headroom-based result determination system 300 may include any devices that may be configured to operate similarly as the data receiving device 310 discussed below. However, while a specific headroom-based result determination system 300 has been illustrated and described, one of skill in the art in possession of the present disclosure will recognize that the headroom-based result determination system of the present disclosure may include a variety of components and component configurations while remaining within the scope of the present disclosure as well.

Referring now to FIG. 4, an embodiment of a headroom-based result determination system 400 is illustrated that may be provided according to the teachings of the present disclosure. In the illustrated embodiment, the headroom-based result determination system 400 includes a networking device 402. In an embodiment, the networking device 402 may be provided by the IHS 100 discussed above with reference to FIG. 1, and/or may include some or all of the components of the IHS 100, and in specific examples may be provided by a switch device. However, while illustrated and discussed as being provided by a switch device, one of skill in the art in possession of the present disclosure will recognize that networking devices provided in the headroom-based result determination system 400 may include any devices that may be configured to operate similarly as the networking device 402 discussed below. In an embodiment, the networking device 402 includes a plurality of ports such as the ports 402a and 402b (e.g., Ethernet switch ports) illustrated in FIG. 4.

In the illustrated embodiment, the headroom-based result determination subsystem 200 discussed above with reference to FIG. 2 is coupled to the networking device 402. For example, a networking cable (e.g., an Ethernet cable) may be connected to the port 208a in the communication system 208 on the headroom-based result determination subsystem 200 and the port 402a on the networking device 402 in order to provide a link between the ports 208a and 402a, and a networking cable (e.g., an Ethernet cable) may be connected to the port 208b in the communication system 208 on the headroom-based result determination subsystem 200 and the port 402b on the networking device 402 in order to provide a link between the ports 208b and 402b. However, while a specific headroom-based result determination system 400 has been illustrated and described, one of skill in the art in possession of the present disclosure will recognize that the headroom-based result determination system of the present disclosure may include a variety of components and component configurations while remaining within the scope of the present disclosure as well.

Referring now to FIG. 5, an embodiment of a headroom-based result determination system 500 is illustrated that may be provided according to the teachings of the present disclosure. In the illustrated embodiment, the headroom-based result determination system 500 includes a networking device 502. In an embodiment, the networking device 502 may be provided by the IHS 100 discussed above with reference to FIG. 1, and/or may include some or all of the components of the IHS 100, and in specific examples may be provided by a switch device. However, while illustrated and discussed as being provided by a switch device, one of skill in the art in possession of the present disclosure will recognize that networking devices provided in the headroom-based result determination system 500 may include any devices that may be configured to operate similarly as the networking device 502 discussed below.

As illustrated, the networking device 502 may include the headroom-based result determination subsystem 200 discussed above with reference to FIG. 2. As such, in some embodiments, a processing system, memory system, storage system, and communication system in a chassis of the networking device 502 may be configured to provide an integrated headroom-based result determination subsystem 200. Furthermore, in other embodiments, the headroom-based result determination subsystem 200 discussed above with reference to FIG. 2 may be provided in the chassis of the networking device 502 as a separate component (e.g., the chassis 202 of the headroom-based result determination subsystem 200 may be circuit board that may be coupled to components in the chassis of the networking device 502). However, while specific implementations of the headroom-based result determination subsystem 200 in the networking device 502 have been described, one of skill in the art in possession of the present disclosure will appreciate how the headroom-based result determination subsystem 200 may be provided in the networking device 502 in a variety of manners that will fall within the scope of the present disclosure as well.

In an embodiment, the networking device 502 includes a plurality of ports such as the port 502a (e.g., an Ethernet switch port) illustrated in FIG. 5. In some embodiments, the port 502a may be provided by any of the ports 208a-208c on the headroom-based result determination subsystem 200 discussed above with reference to FIG. 2 when, for example, the headroom-based result determination subsystem 200 is integrated in the networking device 502. In other embodiments, the port 502a may be coupled to any of the ports 208a-208c on the headroom-based result determination subsystem 200 discussed above with reference to FIG. 2 when, for example, the headroom-based result determination subsystem 200 is provided as a separate component in the networking device 302. However, while a few specific examples of the coupling of the headroom-based result determination subsystem 200 in the networking device 502 to the port 502a have been described, one of skill in the art in possession of the present disclosure will appreciate how the headroom-based result determination subsystem 200 may be coupled to the port 502a in a variety of manners that will fall within the scope of the present disclosure.

In the illustrated embodiment, the headroom-based result determination system 500 also includes a networking device 504 that is coupled to the networking device 502. In an embodiment, the networking device 504 may be provided by the IHS 100 discussed above with reference to FIG. 1, and/or may include some or all of the components of the IHS 100, and in specific examples may be provided by a switch device. However, while illustrated and discussed as being provided by a switch device, one of skill in the art in possession of the present disclosure will recognize that networking devices provided in the headroom-based result determination system 500 may include any devices that may be configured to operate similarly as the networking device 504 discussed below.

As illustrated, the networking device 504 may include the headroom-based result determination subsystem 200 discussed above with reference to FIG. 2. As such, in some embodiments, a processing system, memory system, storage system, and communication system in a chassis of the networking device 504 may be configured to provide an integrated headroom-based result determination subsystem 200. Furthermore, in other embodiments, the headroom-based result determination subsystem 200 discussed above with reference to FIG. 2 may be provided in the chassis of the networking device 504 as a separate component (e.g., the chassis 202 of the headroom-based result determination subsystem 200 may be circuit board that may be coupled to components in the chassis of the networking device 504). However, while specific implementations of the headroom-based result determination subsystem 200 in the networking device 504 have been described, one of skill in the art in possession of the present disclosure will appreciate how the headroom-based result determination subsystem 200 may be provided in the networking device 504 in a variety of manners that will fall within the scope of the present disclosure as well.

In an embodiment, the networking device 504 includes a plurality of ports such as the port 504a (e.g., an Ethernet switch port) illustrated in FIG. 5. In some embodiments, the port 504a may be provided by any of the ports 208a-208c on the headroom-based result determination subsystem 200 discussed above with reference to FIG. 2 when, for example, the headroom-based result determination subsystem 200 is integrated in the networking device 504. In other embodiments, the port 504a may be coupled to any of the ports 208a-208c on the headroom-based result determination subsystem 200 discussed above with reference to FIG. 2 when, for example, the headroom-based result determination subsystem 200 is provided as a separate component in the networking device 504. However, while a few specific examples of the coupling of the headroom-based result determination subsystem 200 in the networking device 504 to the port 504a have been described, one of skill in the art in possession of the present disclosure will appreciate how the headroom-based result determination subsystem 200 may be coupled to the port 504a in a variety of manners that will fall within the scope of the present disclosure.

In the illustrated embodiment, the networking device 504 is coupled to the networking device 502. For example, a networking cable (e.g., an Ethernet cable) may be connected to the port 504a on the networking device 504 and the port 502a on the networking device 502 in order to provide a link between the ports 504a and 502a. However, while a specific headroom-based result determination system 500 has been illustrated and described, one of skill in the art in possession of the present disclosure will recognize that the headroom-based result determination system of the present disclosure may include a variety of components and component configurations while remaining within the scope of the present disclosure as well.

Referring now to FIG. 6, an embodiment of a lossless data communication system 600 is illustrated to provide an example of headroom within a buffer for a port (or a port and a lossless class) in a networking device. As discussed above, lossless Ethernet data communications utilize Ethernet flow control techniques such as pause frames provided according to the IEEE 802.3x standards that treat all data traffic as lossless, or PFC according to the IEEE 802.1Qbb standards that treat certain classes of data traffic as lossless, and one of skill in the art in possession of the present disclosure will appreciate that while the discussions below apply the techniques of the present disclosure to functionality enabled by the IEEE 802.1Qbb standards, those techniques are applicable to functionality enabled by IEEE 802.3x standards while remaining within the scope of the present disclosure as well.

In the illustrated embodiment, the lossless data communication system 600 includes a networking device 602 such as switch device, with a port 602a (e.g., an Ethernet switch port) included on the networking device 602. The lossless data communication system 600 also includes a networking device 604 such as switch device, with a port 604a (e.g., an Ethernet switch port) included on the networking device 604. The ports 602a and 604a are coupled together via a networking cable in order to provide a link between the ports 602a and 604a that one of skill in the art in possession of the present disclosure will recognize is described as being provided by a full duplex link. As illustrated, a buffer 606 may be included in the networking device 604, and a buffer threshold 606a may be defined for the buffer 606. As will be appreciated by one of skill in the art in possession of the present disclosure, the buffer threshold 606a may be thought of as providing both a "pause" threshold above which data transmissions to the networking device 604 are paused (via the transmission of the pause frames/PFC frames discussed above), and a "resume" threshold below which data transmissions to the networking device 604 are resumed (via a de-assertion of the pause resulting from the transmission of the pause frames/PFC frames discussed above, which one of skill in the art in possession of the present disclosure will appreciate results in transmission of a pause/PFC frame with the interval set to zero).

Furthermore, a headroom 606b within the buffer may be defined as the memory/storage space allocated in the buffer 606 over the buffer threshold 606a, and one of skill in the art in possession of the present disclosure will appreciate how data received at the port 604a when the headroom 606b of the buffer 606 is full may be "dropped" or otherwise discarded by the networking device 604. In some examples, headroom may be determined for a port (e.g., as per IEEE 802.3x standards). However, in other examples, headroom may be determined for a port and a class (e.g., as per IEEE 802.1Qbb standards), and while one or more "priorities" of traffic may map to a class, a common use case is to map a single priority to a class (i.e., a 1:1 mapping) for lossless traffic. As will be appreciated by one of skill in the art in possession of the present disclosure, the priority of traffic to which a frame belongs is typically indicated via 802.1p bits of the 802.1Q tag header, or in the Differentiated Services Code Point (DSCP) bits of the Internet Protocol (IP) header, with PFC frames indicating which priority to pause. In the examples described below, headroom per IEEE 802.3x standards may treat all data traffic as belonging to a lossless class, while headroom per IEEE 802.1Qbb standards may map one or more priorities to a lossless class. In either situation, the headroom is a portion of the buffer that is set aside for use in the functionality described below.

Figure 7D:
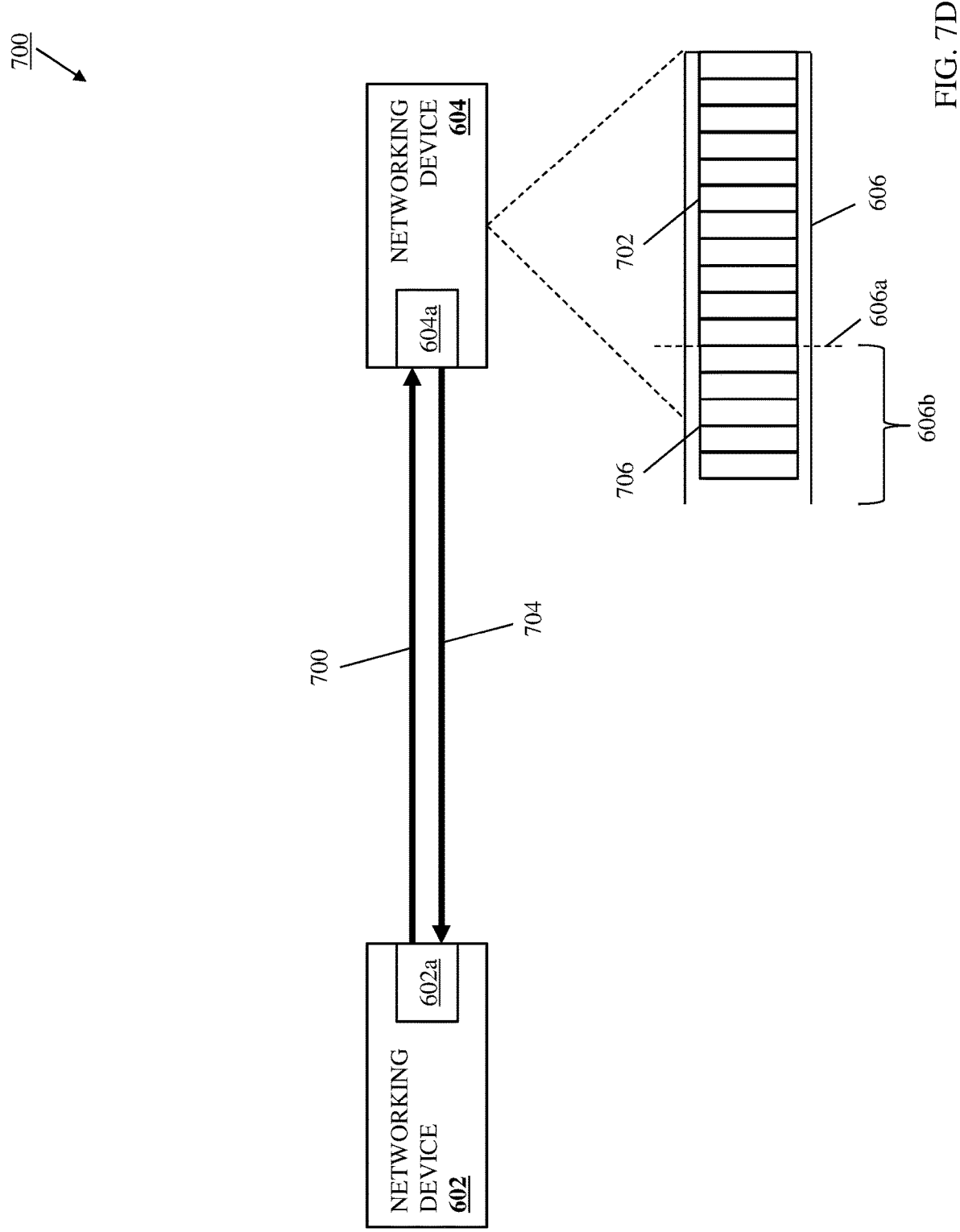
FIG. 7D is a schematic view illustrating an embodiment of the operation of the lossless data communication system of FIG. 6.

With reference to FIGS. 7A, 7B, 7C, 7D, and 7E, the performance of lossless data communications in the lossless data communication system 600 is illustrated. As illustrated in FIG. 7A, the networking device 602 may perform data communication transmission operations 700 that include transmitting data packets through its port 602a and via the link to the port 604a on the networking device 604. In an embodiment in which congestion is being experienced in the networking device 604, the data packets being received at the port 604a may begin to cause the buffer 606 to fill with data 702 from those data packets, with that data 702 being stored in "cells" in the buffer 606 (with different "cells" in the buffer 606 storing data from data packets that are illustrated as different boxes in FIG. 7A). As will be appreciated by one of skill in the art in possession of the present disclosure, the "cells" in the buffer 606 discussed above may be provided by a variety of "buffer units" (e.g., fixed-sized memory blocks within the buffer 606 that may be linked together to store data from data packets) that may be referred to by different memory system vendors using a variety of terms. As illustrated in FIG. 7B, continued performance of the data communication transmission operations 700 while congestion is being experienced in the networking device 604 will cause the buffer 606 to fill with data 702 from those data packets up to the buffer threshold 606a.

With reference to FIG. 7C, in response to the buffer 606 filling with data up to the buffer threshold 606a, the networking device 604 will perform data transmission pause instruction operations 704 that may include generating a data transmission pause instruction (e.g., a pause frame, a PFC frame, etc.), and transmitting that data transmission pause instruction through its port 604a and via the link to the port 602a on the networking device 602. As will be appreciated by one of skill in the art in possession of the present disclosure, in response to receiving the data transmission pause instruction, the networking device 602 will stop performing the data communication transmission operations 700 such that data packets are no longer transmitted through its port 602a and via the link to the port 604a on the networking device 604. However, as illustrated in FIG. 7D, delays between the time the data transmission pause instruction is generated and the time the networking device 602 stops performing the data communication transmission operations 700 result in data packets being received at the port 604a and causing the buffer 606 to fill with data 704 from those data packets beyond the buffer threshold and in the headroom 606b within the buffer 606.

As illustrated in FIG. 7E, once data packets are no longer being received at the port 604a, the networking device 604 will stop performing the data transmission pause instruction operations 704 (e.g., by de-asserting the data transmission pause instruction), and once the congestion in the networking device 604 stops, the data 702 in the buffer 606 (and eventually the data 704 in the headroom 606b within the buffer 606) will be forwarded by the networking device 604 to its destination. To provide a specific example from a buffer accounting standpoint at the ingress to the buffer 606, the transmission of data packets from the buffer 606 once packets are no longer being received at the networking device 604 will cause it to appear as if the headroom 606b within the buffer 606 is being emptied first, and when that buffer accounting shows that the buffer 606 is below the buffer threshold, the pause/PFC operations will be de-asserted (e.g., by sending a pause/PFC message with a pause timer of 0 for the link/priority).

As will be appreciated by one of skill in the art in possession of the present disclosure, the headroom 606b within the buffer 606 should be sized to ensure that it includes enough space to store any data received following the generation of the data transmission pause instruction in order to ensure that the buffer 606 capacity is not exceeded and data from received data packets are dropped or otherwise discarded. However, as discussed above, the determination of headroom size is complicated, and requires consideration of "higher level" delays such as those associated with retrieving data stored in queues, "Media Access Control (MAC)/Physical layer (PHY)" delays such as those associated with data packet transmission via ports and connectors, and "medium" delays such as those associated with transmitting data packets through links provided by cabling between ports. Furthermore, delays associated with Forward Error Correction (FEC) operations, MAC security (MACsec) operations, and/or other operations may need to be considered as well.

As discussed in further detail below, the systems and methods of the present disclosure utilize the concept of "worst-case data packet size" in the determination of headroom size and other headroom-based results. As will be appreciated by one of skill in the art in possession of the present disclosure, the worst-case data packet size considers how data in data packets fills cells in the buffer, and is concerned with the efficient use of the cells in the buffer to store data received in data packets. As such, there are two worst-case considerations: when data in a data packet having a minimum data packet transmission size uses less than half a cell in the buffer of the port, or when data in a data packet fills a first cell and requires 1 byte of a second cell.

To provide a specific example, consider a minimum data packet transmission size of 64 bytes, which one of skill in the art in possession of the present disclosure will appreciate is transmitted as 84 bytes of data on the link between ports due to the need to add 20 bytes of preamble, interframe gap, and/or other information in order to accomplish the data transmission. In many cases a data packet with the minimum data packet transmission size will provide the worst-case packet size, as the storage of the data from that data packet in the cell will waste a relatively large amount of storage space available in that cell. However, if a cell is 208 bytes and a 145-byte data packet is received, when a 64 byte shim header (i.e., bytes added to the data packet for internal processing operations within the networking device, with 64 bytes being the maximum size shim header in this example) is added to the data in that data packet it will require a two cells to store the data: 208 bytes of the data will be stored in the first cell, and 1 byte of the data will be stored in the second cell. As such, the following algorithm may be utilized to determine which of these worst-case considerations result in the worst-case data packet size (e.g., using the 64-byte minimum data packet transmission size and the 20 byte preamble/interframe gap (IFG) used in the specific examples provided above):

IF 64 bytes+(shim header size)<=50% (cell size), then 64 bytes is the worst-case packet size

ELSE, determine x, where x+(shim header size)=(cell size)+1 byte, and

IF x+y<2*(64 bytes+y), then x is the worst-case packet size, ELSE 64 bytes is the worst-case packet size (with the y bytes in this equation being a transmission overhead for the data packet when transmitting that data packet on the wire with a preamble, interframe gap, and any other overhead data that would be apparent to one of skill in the art in possession of the present disclosure, and y being equal to 20 in some specific examples).

To provide a specific example of the difficulties associated with determining the size for headroom within a buffer, consider the factors that would result in the need for a worst-case sized headroom. With reference to the lossless data communication system 600 discussed above, the buffer threshold 606a of the buffer 606 for the port 604a (and lossless class) may be reached and result in the generation of a data transmission pause instruction for the port 602a immediately subsequent to starting the transmission via the port 604a of a maximum size data packet (e.g., a data packet including an amount of data equal to a maximum data packet transmission size for the ports 602a/604a), and thus that data transmission pause instruction will not be transmitted to the port 602a until that maximum size data packet has completed transmission.

Furthermore, the data transmission pause instruction will experience the MAC/PHY delays at the port 604a of the networking device 604 and the networking cable connection thereto, the medium delays in the networking cable, the MAC/PHY delays at the port 602a of the networking device 602 and the networking cable connection thereto, and the higher layer delays at the networking device 602. Further still, the data transmission pause instruction may be received at the networking device 602/port 602a immediately prior to starting the transmission via the port 602a of a maximum size data packet (e.g., a data packet including an amount of data equal to a maximum data packet transmission size for the ports 602a/604a), and thus the pausing of data transmission will be delayed until that maximum size data packet has been transmitted. Finally, the port 602a may be sending data packets having the worst-case packet size at the maximum transmission speed available on the link subsequent to the buffer threshold 606a of the buffer 606 for the port 604a (and lossless class) being reached and the generation of the data transmission pause instruction, and up until the data transmissions are paused.

As such, the worst-case size of the headroom within a buffer must be capable of storing all that data received in data packets transmitted by the port 602a subsequent to the buffer threshold 606a of the buffer 606 for the port 604a (and lossless class) being reached and the generation of the data transmission pause instruction, and up until the data transmissions are paused at the port 602a. However, recreating the scenario described above in a deterministic manner is very difficult, and many factors like the cable/link lengths, the use of features such as FEC and MACsec, and the maximum data packet transmission sizes discussed above are often different in different environments and/or for different classes of data, making accurate estimates relatively difficult.

As discussed below, the systems and methods of the present disclosure provide a primarily measurement-based approach for determining headroom sizes and/or other headroom-based results, while taking into consideration packet boundary conditions like possibility of the need to transmit a maximum size data packet prior to transmitted a data transmission pause instruction at the port 604a discussed above, and the possibility of the need to transmit a maximum size data packet prior to pausing data transmissions at the port 602a as discussed above. The systems and methods of the present disclosure eliminate the need for recreating the worst-case scenario discussed above via measurements made using data transmissions of data packets having the worst-case data packet size, and then add the data storage requirements for the packet boundary conditions discussed above in order to determine a headroom size for the headroom within a buffer and/or other headroom-based results.

Figure 8:
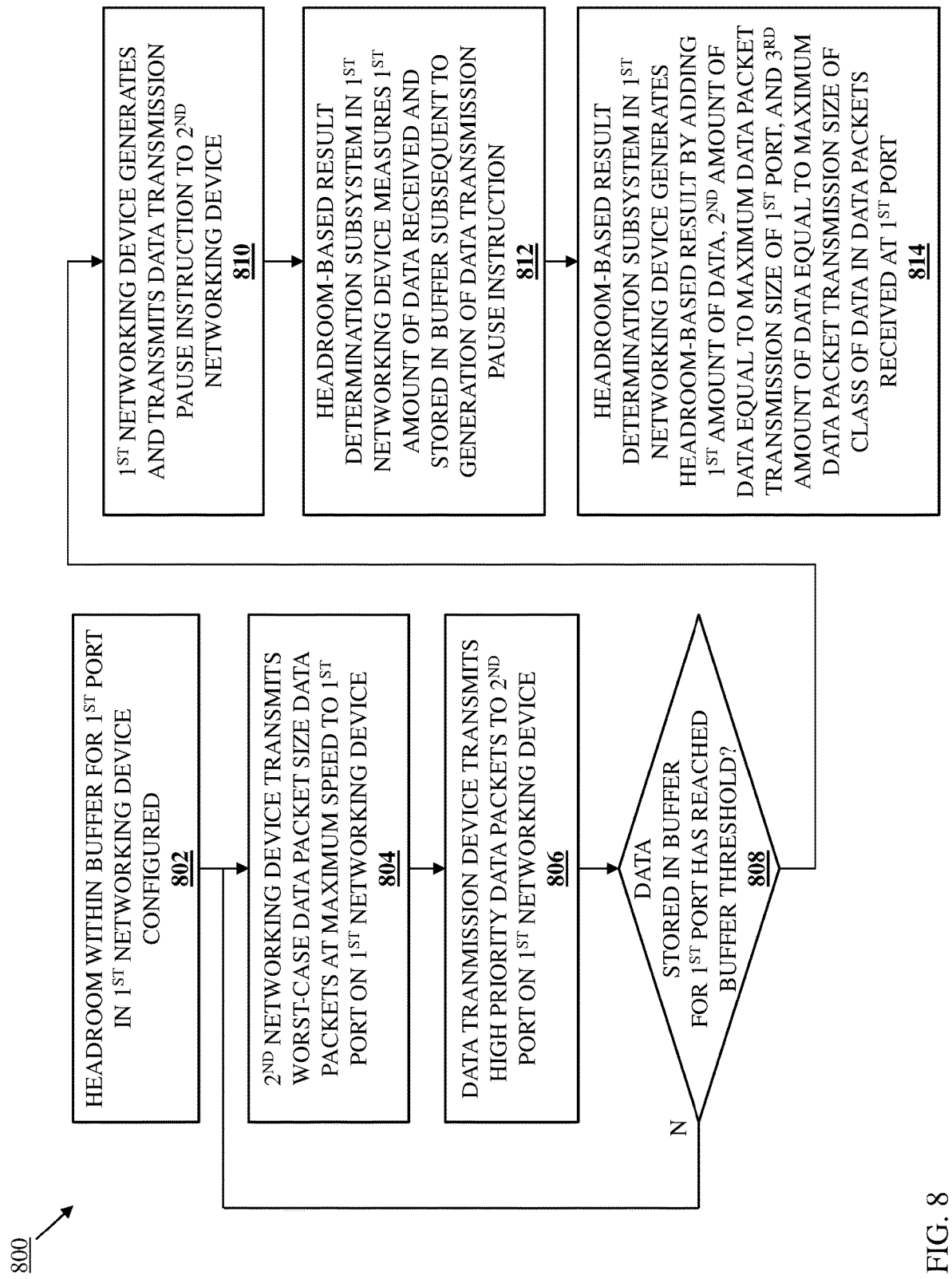
FIG. 8 is a flow chart illustrating an embodiment of a method for determining headroom-based results.

Referring now to FIG. 8, an embodiment of a method 800 for determining a headroom-based result using the headroom-based result determination system 300 of FIG. 3 is illustrated. As discussed below, the systems and methods of the present disclosure provide for the determination of a headroom-based result that is based on a measurement of a first amount of buffer usage subsequent to the generation of a data transmission pause instruction for a first port, a maximum data packet transmission size of the first port, and a maximum data packet transmission size of a class of data received at the first port. For example, the headroom-based result determination system of the present disclosure may include first and second ports connected via a link, and a buffer for the first port. A headroom-based result determination subsystem monitors data stored in the buffer that was received in data packets each having a worst-case data packet size and transmitted at a maximum packet rate for a link speed of the link, determines that a buffer threshold is reached and, in response, generates a pause instruction. The headroom-based result determination subsystem then transmits the pause instruction to the second port, measures a first amount of data stored in the buffer subsequent to generating the pause instruction, and generates a headroom-based result by adding the first amount of data, a second amount of data equal to a maximum transmission size of the first port, and a third amount of data equal to a maximum transmission size of a class of the data received at the first port. As such, buffer headroom size and other headroom-based results may be determined without the issues associated with conventional headroom size determinations discussed above.

The method 800 begins at block 802 where headroom within a buffer for a first port in a first networking device is configured. With reference back to FIG. 3, in an embodiment of block 802, a headroom within the buffer of the port 302a on the networking device 302 may be configured. For example, at block 802, a headroom within a buffer may be determined based on information provided in IEEE specification(s), physical details of the networking device 302, the port 302a, and/or the headroom-based result determination system 300, and/or any of information that would be apparent to one of skill in the art in possession of the present disclosure. As will be appreciated by one of skill in the art in possession of the present disclosure, the determination as discussed above may be performed to provide a headroom size of a headroom within a buffer for the purposes of validation of that headroom size via the method 800, and thus generalizations and/or estimations may be made rather than the more precise, time-consuming calculations and/or other determinations described above.

In some embodiments, at block 802 the headroom within the buffer of the port 302a may be configured using the headroom size determined as discussed above. However, in other embodiments, the headroom within the buffer of the port 302a may be configured with a headroom size that is greater than the headroom size determined as discussed above. Furthermore, while specific examples of the configuration of the headroom within the buffer for the port 302a have been described, one of skill in the art in possession of the present disclosure will appreciate how the headroom within the buffer for the port 302a may be configured in other manners while remaining within the scope of the present disclosure as well.

Figure 9A:
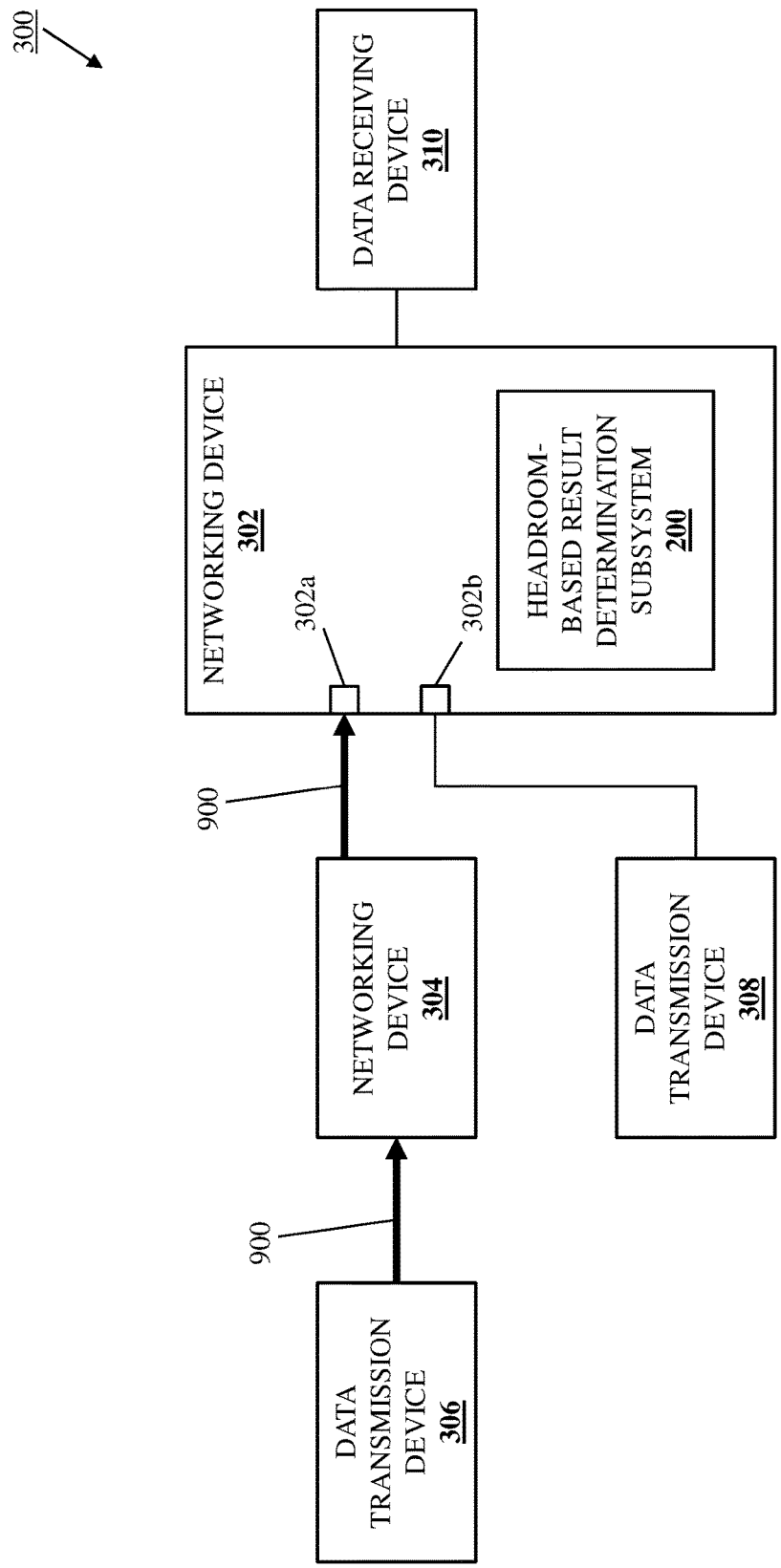
FIG. 9A is a schematic view illustrating an embodiment of the headroom-based result determination system of FIG. 3 operating during the method of FIG. 8.

The method 800 then proceeds to block 804 where a second networking device transmits worst-case data packet size data packets at maximum speed to the first port on the first networking device. With reference to FIG. 9A, in an embodiment of block 804, the data transmission device 306 may perform data packet transmission operations 900 that include transmitting worst-case data packet size data packets at a maximum packet rate for a link speed of the link (e.g., a "line rate" of the link between the networking device 304 and the port 302a) via the networking device 304 and to the networking device 302. For example, the data transmission device 306 may be configured to generate data packets that have data associated with a lossless data class and that are configured with the worst-case data packet size determined as discussed above, and transmit those data packets to the data receiving device 310 such that those data packets are transmitted at a maximum packet rate for a link speed of the link from a port on the networking device 304 to the port 302a on the networking device 302. As such, the maximum speed at which the data packets are transmitted may be the maximum speed at which the port on the networking device 304 is configured to transmit data, and/or the maximum speed at which the port 302a on the networking device 302 is configured to receive data. However, while a specific example of the receiving of data packets at the port 302a has been provided, one of skill in the art in possession of the present disclosure will appreciate how the port 302a may receive data in other manners that will fall within the scope of the present disclosure as well.

Figure 9B:
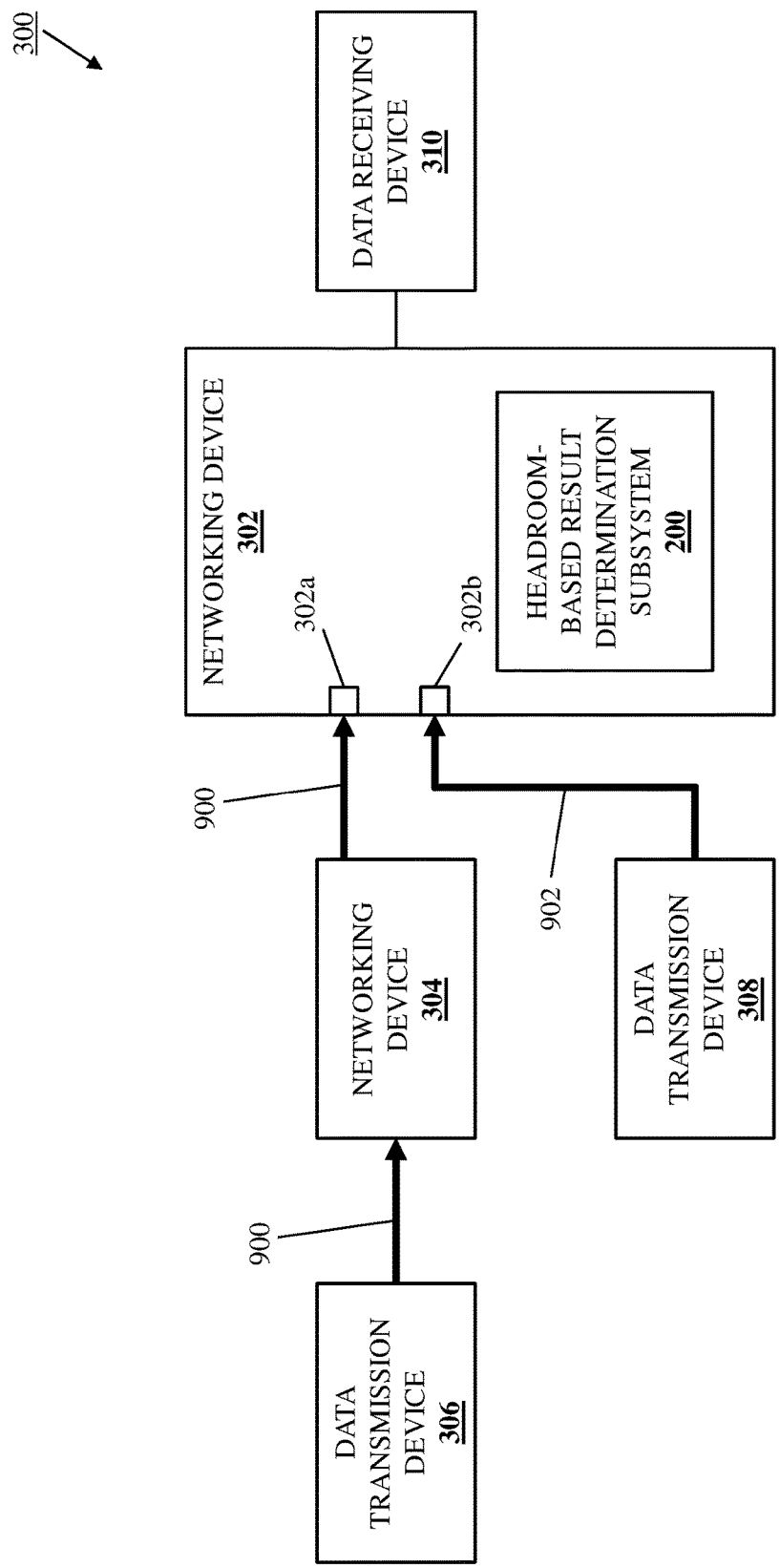
FIG. 9B is a schematic view illustrating an embodiment of the headroom-based result determination system of FIG. 3 operating during the method of FIG. 8.
Figure 9C:
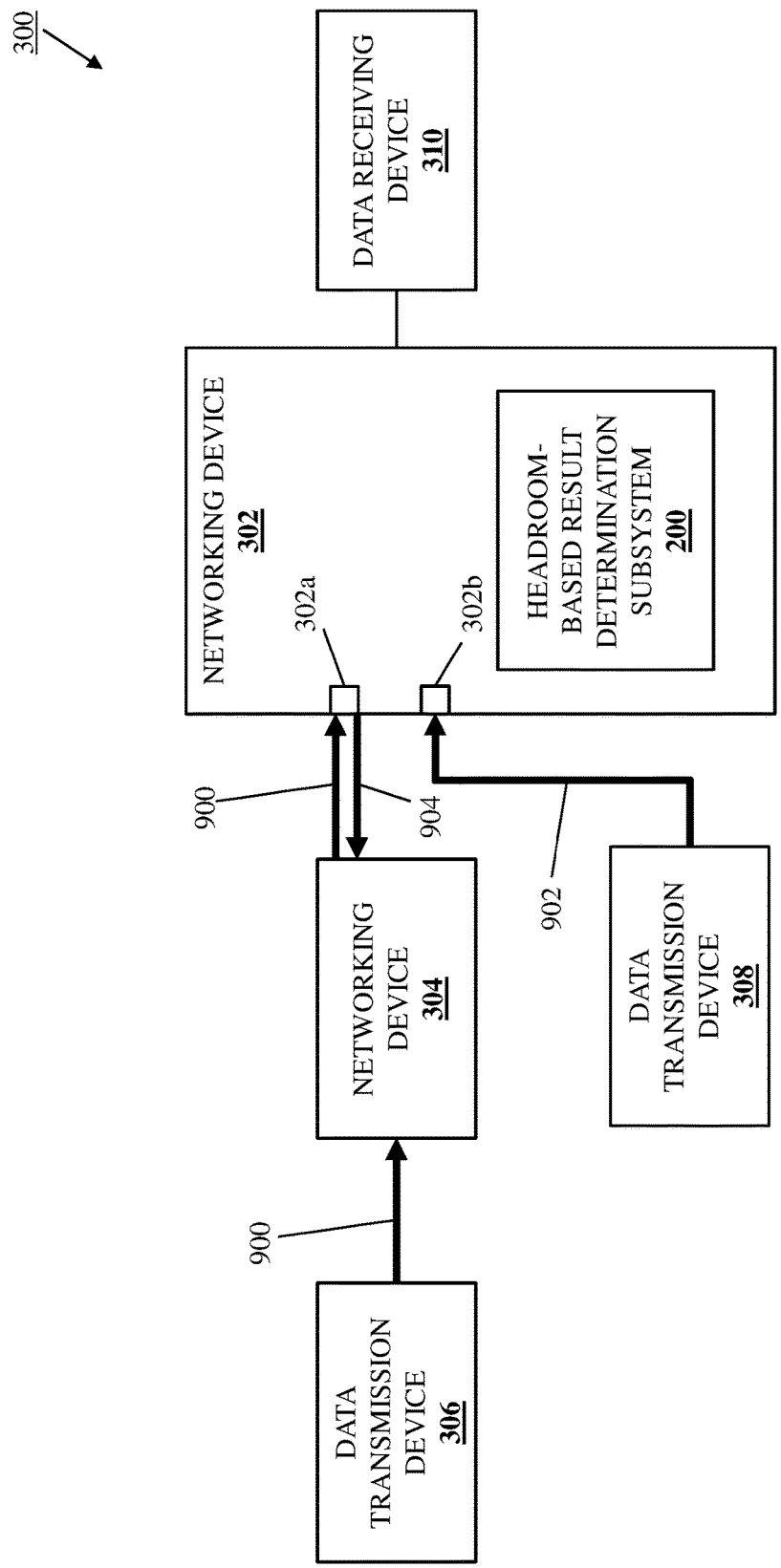
FIG. 9C is a schematic view illustrating an embodiment of the headroom-based result determination system of FIG. 3 operating during the method of FIG. 8.

The method 800 then proceeds to block 806 where a data transmission device transmits high priority data packets to a second port on the first networking device. With reference to FIG. 9B, in an embodiment of block 806, the data transmission device 308 may perform data packet transmission operations 902 that include transmitting data packets to the port 302b on the networking device 302 that are of higher priority than the data packets received by the networking device 302 from the data transmission device 306 via the networking device 304 at block 804. For example, the data transmission device 308 may be configured to generate data packets with a higher priority than the data packets transmitted by the data transmission device 306, and transmit those data packets to the data receiving device 310 such that those data packets are received at the port 302b on the networking device 302 and create a congestion situation that requires the networking device 302 to stop forwarding the data packets received from the data transmission device 306. However, while a specific example of creating a congestion situation in the networking device 302 has been provided, one of skill in the art in possession of the present disclosure will appreciate how the networking device 302 may be caused to generate and transmit the data transmission pause instruction discussed below using other techniques that will fall within the scope of the present disclosure as well.

The method 800 then proceeds to decision block 808 where it is determined whether data stored in the buffer for the first port has reached a buffer threshold. In an embodiment, at decision block 808, the headroom-based result determination engine 204 in the headroom-based result determination subsystem 200 of the networking device 302 may perform buffer monitoring operations that include monitoring the buffer for the port 302a on the networking device 302. Similarly as discussed above with reference to the buffer 606 for the port 604a in the networking device 604 of the lossless data communication system 600 of FIG. 6 operating as per FIGS. 7A and 7B, the headroom-based result determination engine 204 may monitor the buffer for the port 302a to determine whether data stored therein reaches the buffer threshold of that buffer (e.g., similarly as discussed above for the buffer threshold 606a of the buffer 606). As will be appreciated by one of skill in the art in possession of the present disclosure, the congestion situation in the networking device 302 as a result of the relatively higher priority data packets received at port 302b will cause the networking device 302 to store data included in the relatively lower priority data packets received at the port 302a in the buffer for that port 302a, and as more of the relatively lower priority data packets are received at the port 302a, the buffer for the port 302a will begin to fill with data towards its buffer threshold. If, at decision block 806, it is determined that data stored in the buffer for the first port has not reached the buffer threshold, the method 800 returns to block 804. As such, the method 800 may loop such that the data transmission device 306 performs the data transmission operations 900 and the data transmission device 308 performs the data transmission operations 902 as long as the buffer threshold of the buffer for the port 302a (and lossless class) on the networking device 302 is not reached.

If at decision block 806, it is determined that data stored in the buffer for the first port has reached the buffer threshold, the method 800 proceeds to block 810 where the first networking device generates and transmits a data transmission pause instruction to the second networking device. In an embodiment, at block 810 and in response to determining that the data stored in the buffer for the port 302a (and lossless class) on the networking device 302 has reached the buffer threshold, the headroom-based result determination engine 204 in the headroom-based result determination subsystem 200 of the networking device 302 may perform data transmission pause instruction generation operations that include generating a data transmission pause instruction (e.g., a pause frame, a PFC communication, etc.), followed by data transmission pause instruction transmission operations 904 that include transmitting the data transmission pause instruction via the port 302a and to the networking device 304. For example, the generation and transmission of the data transmission pause instruction at block 810 may be performed similarly as discussed above with reference to the networking device 604 of the lossless data communication system 600 of FIG. 6 operating as per FIG. 7C.

The method 800 then proceeds to block 812 where a headroom-based result determination subsystem in the first networking device measures a first amount of data received and stored in the buffer subsequent to the generation of the data transmission pause instruction. In an embodiment, at block 812 and following the generation of the data transmission pause instruction at block 810, the headroom-based result determination engine 204 in the headroom-based result determination subsystem 200 of the networking device 302 may perform headroom data storage measurement operations that include measuring an amount of data that is received and stored in the buffer for the port 302a on the networking device 302 subsequent to the generation of the data transmission pause instruction. Similarly as discussed above with reference to the headroom 606b of the buffer 606 for the port 604a in the networking device 604 of the lossless data communication system 600 of FIG. 6 operating as per FIG. 7D, subsequent to the generation of the data transmission pause instruction at block 810, the headroom within the buffer for the port 302a on the networking device 302a will be used to store data from any data packets that are received subsequent to generating that data transmission pause instruction.

Figure 9D:
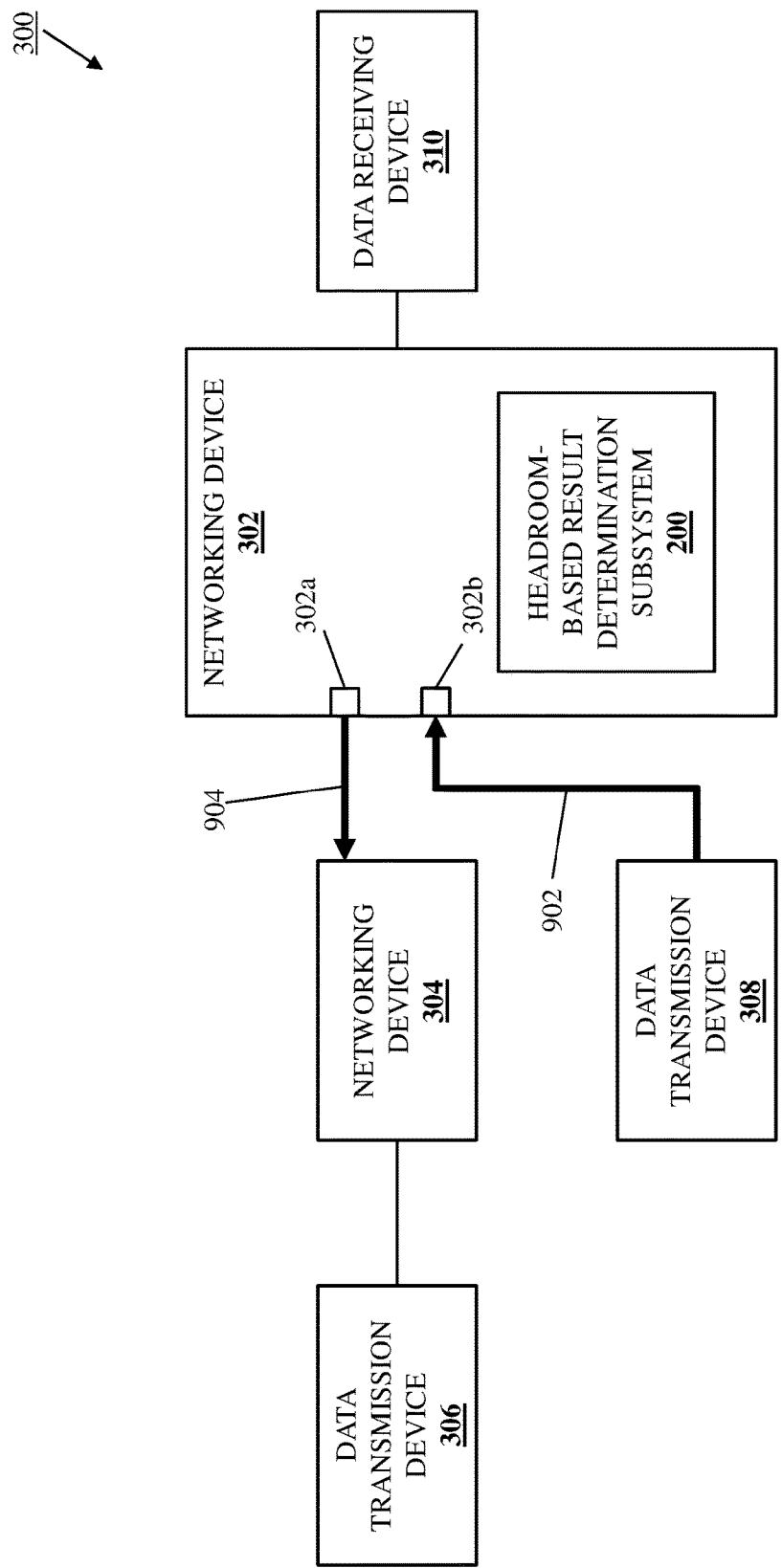
FIG. 9D is a schematic view illustrating an embodiment of the headroom-based result determination system of FIG. 3 operating during the method of FIG. 8.

With reference to FIG. 9D, similarly as discussed above with reference to the headroom 606b of the buffer 606 for the port 604a in the networking device 604 of the lossless data communication system 600 of FIG. 6 operating as per FIG. 7E, data packets will stop being received via the port 302a on the networking device 302, and the headroom-based result determination engine 204 may measure the amount of data that was received and stored in the buffer for the port 302a subsequent to the generation of the data transmission pause instruction amount, i.e., data stored in the headroom within the buffer for the port 302a. For example, the headroom-based result determination engine 204 may utilize a latched counter (e.g., for storing a maximum value that may be cleared in response to reads or administrator instructions) to measure the amount of data stored in the headroom within the buffer for the port 302a, although other techniques for measuring buffer/headroom usage will fall within the scope of the present disclosure as well. As such, the headroom-based result determination engine 204 may provide a running counter measuring dynamic headroom consumption, and the latched counter discussed above that determines the maximum headroom consumed (e.g., as the running counter may not have the maximum value at the time of reading).

However, this example assumes that the generation of the data transmission pause instruction occurs immediately in response to the buffer threshold of the buffer for the port 302a (and lossless class) being reached, one of skill in the art in possession of the present disclosure will appreciate if delays exist between the buffer threshold of the buffer for the port 302a (and lossless class) being reached and the generation of the data transmission pause instruction, the measurement at block 812 may be of the amount of data that was received and stored in the buffer for the port 302a subsequent to the buffer threshold of the buffer for the port 302a (and lossless class) being reached. As will be appreciated by one of skill in the art in possession of the present disclosure, once data packets are no longer received via the port 302a on the networking device 302, the data transmission operations 900 and 902 by the data transmission devices 306 and 308, respectively, may be stopped, and the data transmission pause instruction operations 904 by the networking device 302 may be stopped (e.g., by de-asserting the data transmission pause instruction).

The method 800 then proceeds to block 814 where the headroom-based result determination subsystem in the first networking device generates a headroom-based result by adding the first amount of data, a second amount of data equal to a maximum data packet transmission size of the first port, and a third amount of data equal to a maximum data packet transmission size of a class of the data in the data packets received at the first port. In an embodiment, at block 814, the headroom-based result determination engine 204 in the headroom-based result determination subsystem 200 of the networking device 302 may perform headroom-based result generation operations that include generating a headroom-based result by adding the amount of data determined at block 812, an amount of data equal to a maximum data packet transmission size (e.g., a Maximum Transmission Unit (MTU)) of the port 302a on the networking device 302, and an amount of data equal to a maximum data packet transmission size of the class (e.g., a Maximum Transmission Unit (MTU) of the lossless data class) of the data in the data packets transmitted from the networking device 304 to the port 302a.

As discussed above, the headroom of a buffer in a switch may be provisioned/maintained in terms of "cells", and the MTUs discussed above may be converted to cells before generating some of the headroom-based results such as the headroom size headroom-based results discussed below. For example, the following function may provide for such a conversion (with CEILING provided by a mathematical function that rounds up a fractional number to the next highest integer):

CEILING((MTU+shim header size)/cell size)

One of skill in the art in possession of the present disclosure will also recognize that headroom-based results such as the headroom compliance of a device to delays per IEEE specifications discussed below is measured in bytes, and thus the MTUs discussed above need not be converted for the headroom compliance headroom-based results discussed below. As will be appreciated by one of skill in the art in possession of the present disclosure, the headroom-based result generation operations take the packet boundary conditions discussed above into account when generating the headroom-based result, with the amount of data equal to the maximum data packet transmission size of the port 302*a* covering the situation in which a maximum size data packet must be transmitted via the port 302*a* prior to the transmission of a data transmission pause instruction that was generated immediately prior to initiation of the transmission of that maximum size data packet, and the maximum data packet transmission size of the class of the data in the data packets transmitted from the networking device 304 to the port 302*a* covering the situation in which a maximum size data packet must be transmitted by the networking device 304 prior to pausing data transmissions to the port 302*a* on the networking device 302.

As such, the headroom-based result may include a sum of 1) an amount of bytes of data stored in the headroom within the buffer for the port 302*a*, 2) an amount of bytes of data in a maximum sized data packet that may be transmitted by the port 302*a*, 3) an amount of bytes of data in a maximum sized data packet that may be transmitted by the networking device 304 to the port 302*a*. As will be appreciated by one of skill in the art in possession of the present disclosure, that sum may be used as a worst-case headroom size (e.g., a number of bytes) required for the headroom within the buffer for the port 302*a*, as a "bit time" for the networking device 304 that may be based on the maximum speed that data may be transmitted from the networking device 304 to the port 302*a* via the link between them, and/or for a variety of other headroom-based results that would be apparent to one of skill in the art in possession of the present disclosure.

In a specific example, the headroom-based result determination system 300 and method 800 may be used as a headroom validation system that is configured to validate whether a networking device (e.g., a switch device, a Network Interface Controller (NIC), etc.) is compliant with the maximum delays specified by IEEE specifications such as the IEEE 802.1Qbb specification. For example, as long as the worst-case headroom size or "bit time" for the networking device 304 generated by the headroom-based result determination system 300 via the method 800 does not exceed the headroom configured at block 802, the networking device 304 may be considered compliant with the maximum delays specified by the IEEE specifications used to determine that headroom. Furthermore, one of skill in the art in possession of the present disclosure will appreciate how the headroom within the buffer for the port 302*a* may be adjusted using the headroom-based result to ensure that data transmission from the networking device 304 cannot exceed it. However, while a specific headroom-based result determination system and method has been described, the teachings of the present disclosure may be implemented in other systems and methods while remaining within the scope of the present disclosure as well.

Figure 10:
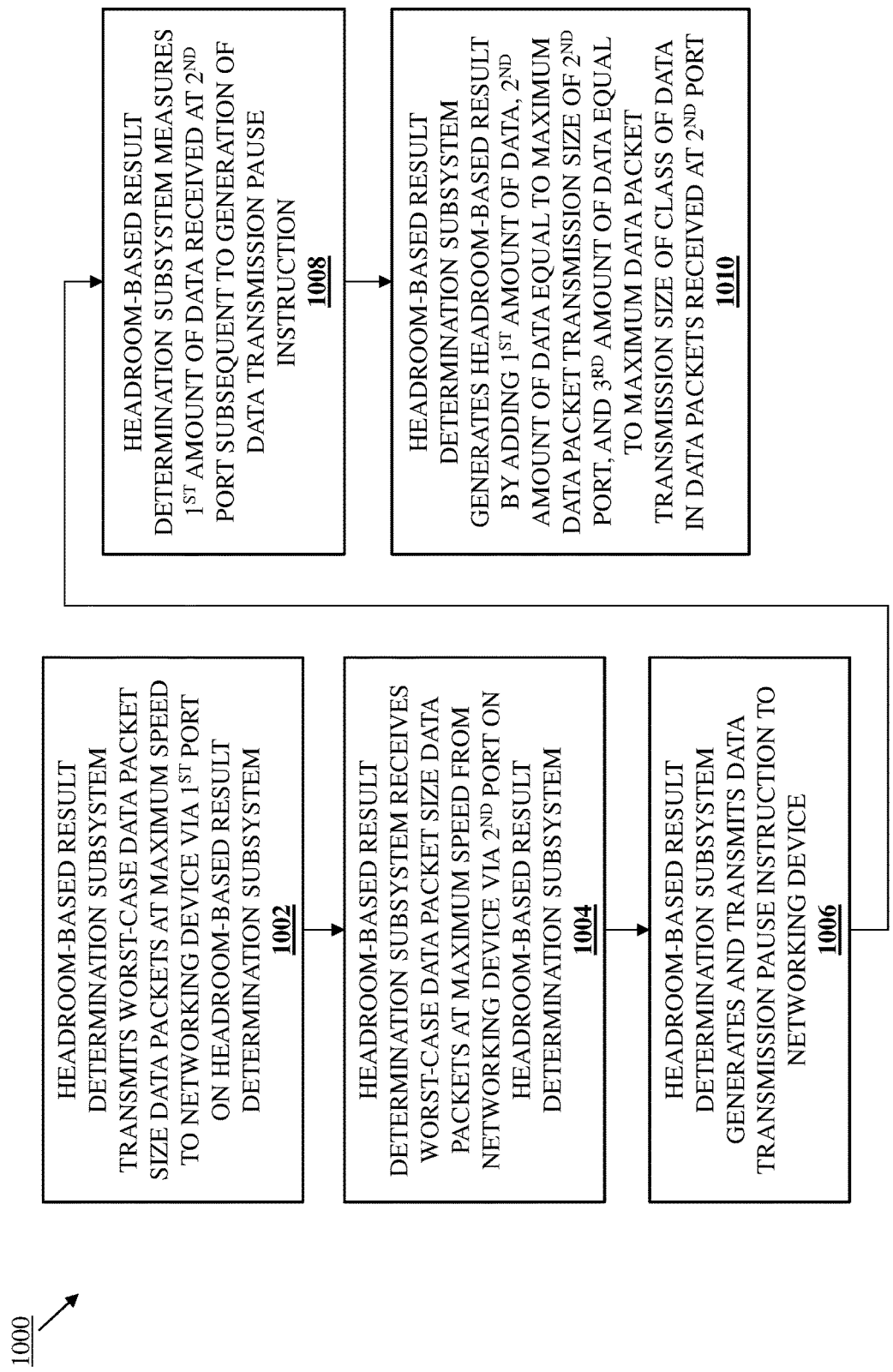
FIG. 10 is a flow chart illustrating an embodiment of a method for determining headroom-based results.

For example, referring now to FIG. 10, an embodiment of a method 1000 for determining a headroom-based result using the headroom-based result determination system 400 of FIG. 4 is illustrated. With reference back to FIG. 4, prior to or during the method 1000, the port 208*a* on the headroom-based result determination subsystem 200 may be configured to transmit data with a lossless data class having a maximum data packet transmission size (e.g., an MTU for that class of data), and the port 208*b* on the headroom-based result determination subsystem 200 may be configured with a maximum data packet transmission size (e.g., an MTU for the port 208*b*).

Figure 11A:
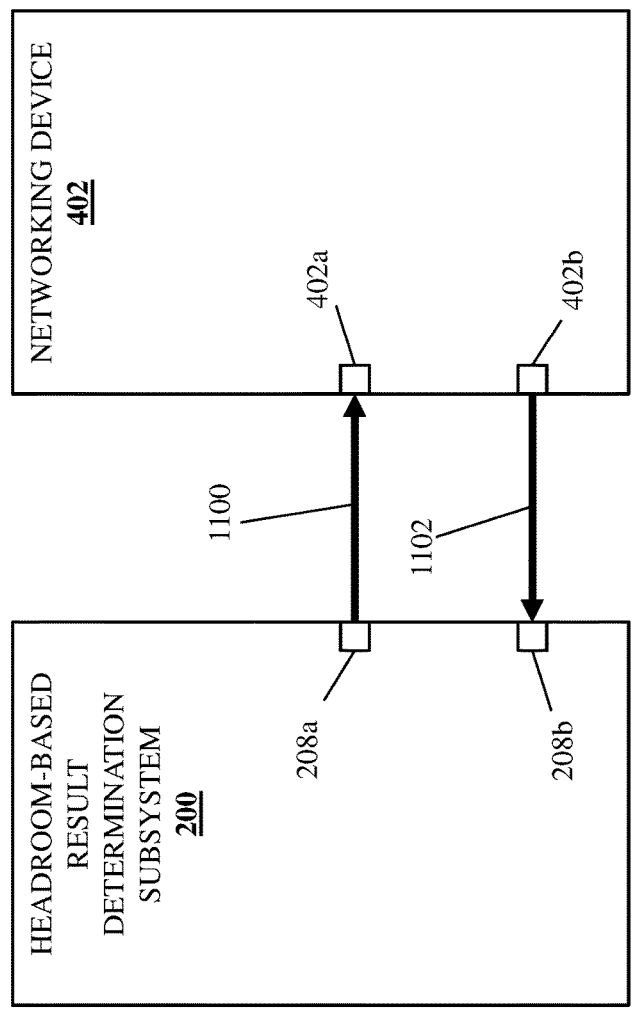
FIG. 11A is a schematic view illustrating an embodiment of the headroom-based result determination system of FIG. 4 operating during the method of FIG. 10.

The method 1000 begins at block 1002 where a headroom-based result determination subsystem transmits worst-case data packet size data packets at maximum speed to a networking device via a first port on the headroom-based result determination subsystem. With reference to FIG. 11A, in an embodiment of block 1002, the headroom-based result determination engine 204 in the headroom-based result determination subsystem 200 may perform data packet transmission operations 1100 that include transmitting worst-case data packet size data packets at a maximum packet rate for a link speed of the link (e.g., a "line rate" of the link between the port 208*a* on the headroom-based result determination subsystem 200 and the port 402*a* on the networking device 402). For example, the headroom-based result determination engine 204 may be configured to generate data packets that have the data associated with the lossless data class and that are configured with the worst-case data packet size determined as discussed above, and transmit those data packets via the port 208*a* on the headroom-based result determination subsystem 200 to the port 402*a* on the networking device 402. As such, the maximum speed at which the data packets are transmitted may be the maximum speed at which the 208*a* is configured to transmit data, and/or the maximum speed at which the port 402*a* is configured to receive data. However, while a specific example of the transmission of data packets via the port 208*a* has been provided, one of skill in the art in possession of the present disclosure will appreciate how the data may be transmitted via the port 208*a* in other manners that will fall within the scope of the present disclosure as well.

The method 1000 then proceeds to block 1004 where the headroom-based result determination subsystem receives the worst-case data packet size data packets at maximum speed from the networking device via a second port on the headroom-based result determination subsystem. With continued reference to FIG. 11A, in an embodiment of block 1004, the networking device 402 may be configured to receive the data packets having the worst-case data packet size via the port 402*a* from the headroom-based result determination subsystem 200, and perform data transmission operations 1102 that include transmitting those data packets via its port 402*b* and back to the headroom-based result determination subsystem 200 via its port 208*b*. As such, the maximum speed at which the data packets are transmitted may be the maximum speed at which the 402*b* is configured to transmit data, and/or the maximum speed at which the port 208*b* is configured to receive data. However, while the headroom-based result determination subsystem 200 is described as transmitting data packets having the worst-case data packet size via its port 208*a* and receiving those data packets back via its port 208*b*, as discussed below some embodiments of the present disclosure may not require the transmission and reception of data packets having the worst-case data packet size, and rather data packets of any data packet size may be transmitted while remaining within the scope of the present disclosure as well.

Figure 11B:
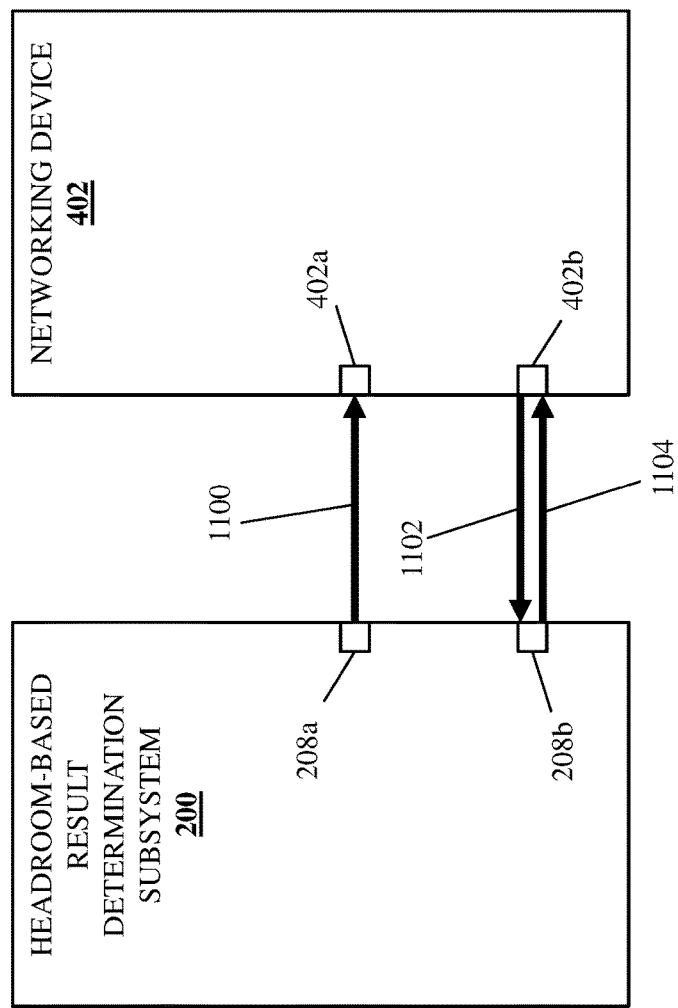
FIG. 11B is a schematic view illustrating an embodiment of the headroom-based result determination system of FIG. 4 operating during the method of FIG. 10.

The method 1000 then proceeds to block 1006, where the headroom-based result determination subsystem generates and transmits a data transmission pause instruction to the networking device. With reference to FIG. 11B, in an embodiment of block 1006, the headroom-based result determination engine 204 in the headroom-based result determination subsystem 200 may perform data transmission pause instruction generation operations that include generating a data transmission pause instruction (e.g., a pause frame, a PFC communication, etc.), followed by data transmission pause instruction transmission operations 1104 that include transmitting the data transmission pause instruction via the port 208*b* and to the port 402*b* on the networking device 402. As will be appreciated by one of skill in the art in possession of the present disclosure, the data transmission pause instruction may be asserted throughout the remainder of the method 1000 following its transmission at block 1006.

In some embodiments, the generation and transmission of the data transmission pause instruction at block 1006 may be performed similarly as discussed above with reference to block 810 and in response to the headroom-based result determination engine 204 determining that data stored in a buffer for the port 208b on the headroom-based result determination subsystem 200 has reached a buffer threshold, and one of skill in the art in possession of the present disclosure will appreciate how the transmission and reception by the headroom-based result determination subsystem 200 of the data packets having the worst-case data packet size may be utilized in such embodiments. However, in other embodiments, the generation and transmission of the data transmission pause instruction at block 1006 may be performed by the headroom-based result determination engine 204 at any time following the receiving of the data packets from the networking device 402 at the port 208b, and one of skill in the art in possession of the present disclosure will appreciate how the transmission and reception by the headroom-based result determination subsystem 200 of data packets having any data packet size (and not necessarily the worst-case data packet size) may be utilized in such embodiments.

The method 1000 then proceeds to block 1008 where the headroom-based result determination subsystem in the first networking device measures a first amount of data received at the second port subsequent to the generation of the data transmission pause instruction. In an embodiment, at block 1008 and following the generation of the data transmission pause instruction at block 1006, the headroom-based result determination engine 204 in the headroom-based result determination subsystem 200 may perform headroom data storage measurement operations that include measuring an amount of data that is received at its port 208b subsequent to the generation of the data transmission pause instruction. With reference to FIG. 11C, similarly as discussed above, at some time subsequent to the generation of the data transmission pause instruction, data packets will stop being received via the port 208b on the headroom-based result determination subsystem 200, and the headroom-based result determination subsystem 200 may measure the amount of data that was received via the port 208b subsequent to the generation of the data transmission pause instruction.

In some embodiments, the headroom data storage measurement operations may be performed similarly as discussed above with reference to block 812, with the headroom-based result determination engine 204 measuring the amount of data that was received and stored in the buffer for the port 208b subsequent to the generation of the data transmission pause instruction amount, i.e., data stored in the headroom within the buffer for the port 208b, and one of skill in the art in possession of the present disclosure will appreciate how the transmission and reception by the headroom-based result determination subsystem 200 of the data packets having the worst-case data packet size may be utilized in such embodiments. For example, the headroom-based result determination engine 204 may utilize a latched counter similar to that described above to measure the amount of data stored in the headroom within the buffer for the port 208b, although other techniques for measuring buffer/headroom usage will fall within the scope of the present disclosure as well. Similarly as described above, this example assumes that the generation of the data transmission pause instruction occurs immediately in response to the buffer threshold of the buffer for the port 208b (and lossless class) being reached, and one of skill in the art in possession of the present disclosure will appreciate if delays exist between the buffer threshold of the buffer for the port 208b (and lossless class) being reached and the generation of the data transmission pause instruction, the measurement at block 1008 may be of the amount of data that was received and stored in the buffer for the port 208b subsequent to the buffer threshold of the buffer for the port 208b (and lossless class) being reached.

However, in other embodiments, the headroom data storage measurement operations may include the headroom-based result determination engine 204 measuring the amount of data that is received via the port 208b subsequent to the generation of the data transmission pause instruction amount, but without that data being stored in a buffer for the port (e.g., counting the data packets received via the port 208b and then dropping or otherwise discarding those data packets), and one of skill in the art in possession of the present disclosure will appreciate how the transmission and reception by the headroom-based result determination subsystem 200 of data packets having any data packet size (and not necessarily the worst-case data packet size) may be utilized in such embodiments.

The method 1000 then proceeds to block 1010 where the headroom-based result determination subsystem generates a headroom-based result by adding the first amount of data, a second amount of data equal to a maximum data packet transmission size of the second port, and a third amount of data equal to a maximum data packet transmission size of a class of the data in the data packets received at the second port. In an embodiment, at block 1010, the headroom-based result determination engine 204 in the headroom-based result determination subsystem 200 may perform headroom-based result generation operations that include generating a headroom-based result by adding the amount of data determined at block 1008, an amount of data equal to the maximum data packet transmission size (e.g., an MTU) of the port 208b on the headroom-based result determination subsystem 200, and an amount of data equal to the maximum data packet transmission size of the class (e.g., an MTU of the lossless data class) of the data in the data packets transmitted via the port 208a to the networking device 402 (and via the networking device 402 and to the port 208b via the port 402b).

Similarly as discussed above, the headroom-based result generation operations take the packet boundary conditions discussed above into account when generating the headroom-based result, with the amount of data equal to the maximum data packet transmission size of the port 208b covering the situation in which a maximum size data packet must be transmitted via the port 208b prior to the transmission of a data transmission pause instruction that was generated immediately prior to initiation of the transmission of that maximum size data packet, and the maximum data packet transmission size of the class of the data in the data packets transmitted from the port 402b to the port 208b covering the situation in which a maximum size data packet must be transmitted by the networking device 402 prior to pausing data transmissions at the port 402b.

As such, the headroom-based result may include a sum of 1) an amount of bytes of data stored in the headroom within the buffer for the port 208b or received via the port 208b subsequent to generating the data transmission pause instruction, 2) an amount of bytes of data in a maximum sized data packet that may be transmitted by the port 208*b*, 3) an amount of bytes of data in a maximum sized data packet that may be transmitted by the networking device 402 to the port 208*b*. As will be appreciated by one of skill in the art in possession of the present disclosure, that sum may be used as a "bit time" for the networking device 402 that may be based on the maximum speed data may be transmitted from the networking device 402 and through the port 402*b* to the port 208*b* via the link between them, and/or for a variety of other headroom-based results that would be apparent to one of skill in the art in possession of the present disclosure.

In a specific example, the headroom-based result determination system 400 and method 1000 may be used as a testing system that is configured to validate whether a networking device (e.g., a switch device, a Network Interface Controller (NIC), etc.) is compliant with the maximum delays specified by IEEE specifications such as the IEEE 802.1Qbb specification. For example, as long as the "bit time" for the networking device 402 generated by the headroom-based result determination system 300 via the method 800 does not exceed maximum delays specified by the IEEE specifications, the networking device 402 may be considered compliant. However, while a specific headroom-based result determination system and method has been described, the teachings of the present disclosure may be implemented in other systems and methods while remaining within the scope of the present disclosure as well.

Figure 12:
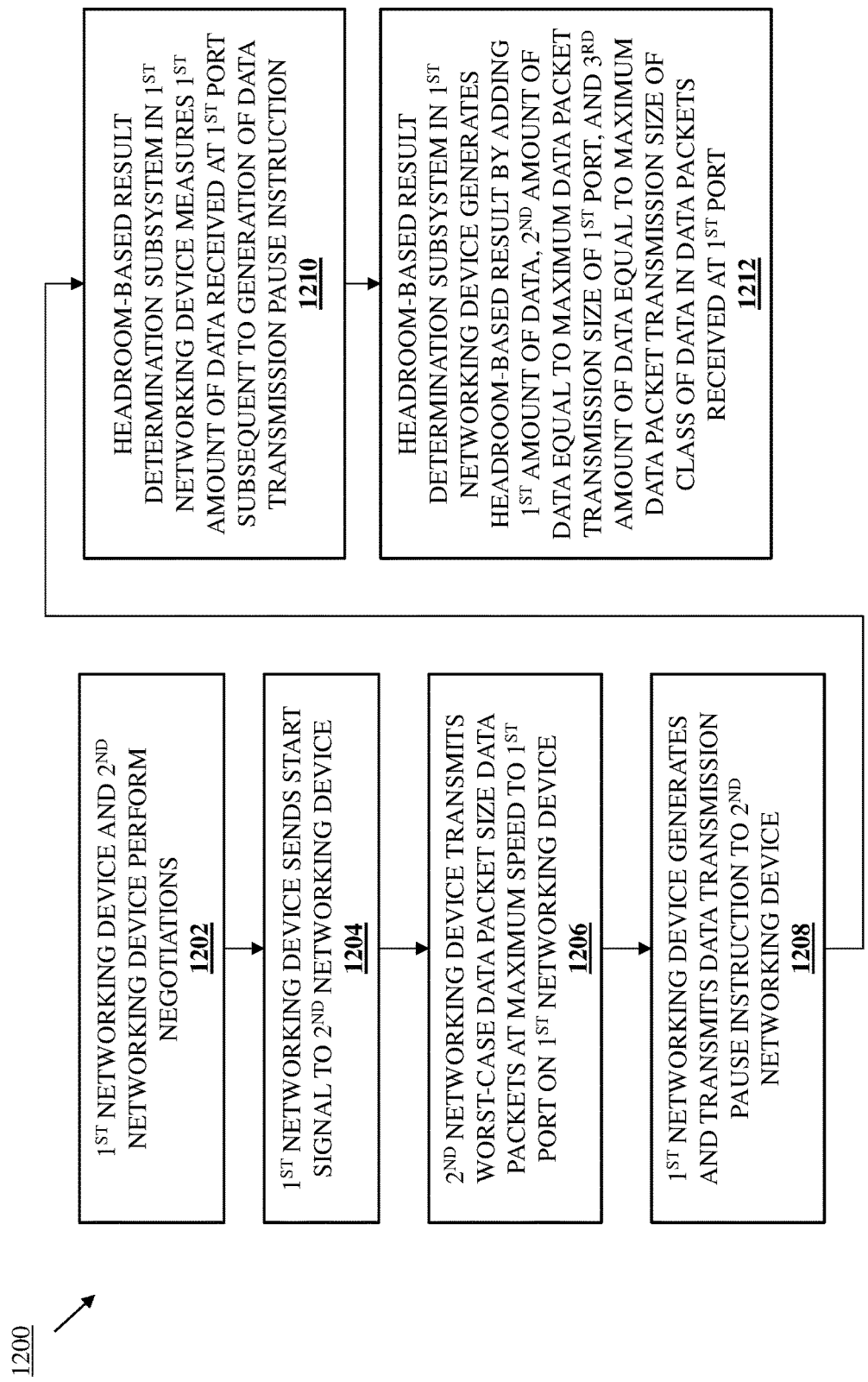
FIG. 12 is a flow chart illustrating an embodiment of a method for determining headroom-based results.

For example, referring now to FIG. 12, an embodiment of a method 1200 for determining a headroom-based result using the headroom-based result determination system 500 of FIG. 5 is illustrated. With reference back to FIG. 5, the method 1200 is described below as being performed to automatically configure headroom within a buffer for the port 502*a* on the networking device 502, but one of skill in the art in possession of the present disclosure will recognize how the method 1200 may be performed to automatically configure headroom within a buffer for the port 504*a* on the networking device 504 (e.g., while configuring the headroom within the buffer for the port 502*a* on the networking device 502 as described in detail below) while remaining within the scope of the present disclosure as well.

Figure 13A:
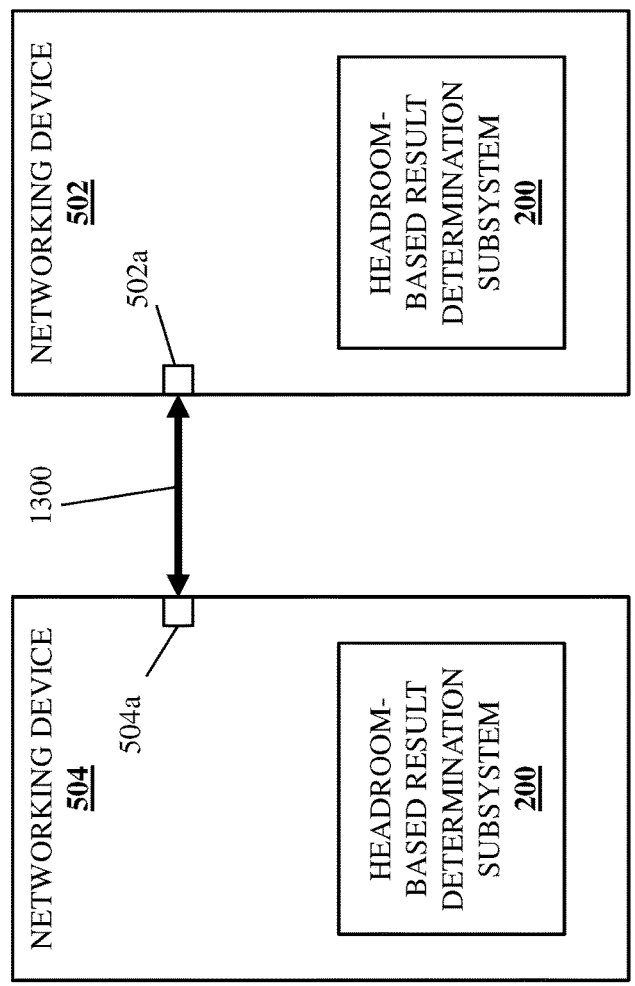
FIG. 13A is a schematic view illustrating an embodiment of the headroom-based result determination system of FIG. 5 operating during the method of FIG. 12.

The method 1200 begins at block 1202 where the first networking device and the second networking device perform negotiations. With reference to FIG. 13A, in an embodiment of block 1202, the headroom-based result determination engine 204 in the headroom-based result determination subsystem 200 of the networking device 502 and the headroom-based result determination engine 204 in the headroom-based result determination subsystem 200 of the networking device 504 may perform negotiation operations 1300 via their ports 502*a* and 504*a*, respectively. In an embodiment, the negotiation operations 1300 may be performed to negotiate a communication protocol such as, for example, the Link Layer Discovery Protocol (LLDP) or other protocols that one of skill in the art in possession of the present disclosure would recognize as allowing for the headroom size configuration operations discussed below. In a specific example, as part of the negotiation operations, the networking devices 502 and 504 may exchange worst-case data packet sizes determined as discussed above, as well as any other information that would be apparent to one of skill in the art in possession of the present disclosure.

Figure 13B:
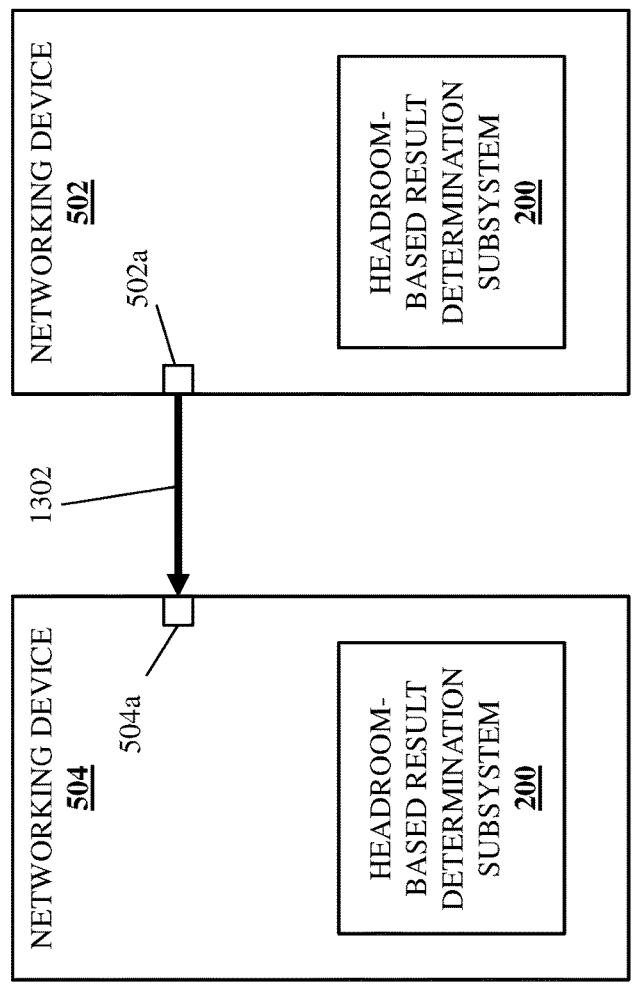
FIG. 13B is a schematic view illustrating an embodiment of the headroom-based result determination system of FIG. 5 operating during the method of FIG. 12.

The method 1200 then proceeds to block 1204 where the first networking device sends a start signal to the second networking device. With reference to FIG. 13B, in an embodiment of block 1204, the headroom-based result determination engine 204 in the headroom-based result determination subsystem 200 of the networking device 502 may perform start signal transmission operations 1302 that may include generating and transmitting a start signal via its port 502*a* to the headroom-based result determination engine 204 in the headroom-based result determination subsystem 200 of the networking device 504 via its port 504*a*. As discussed below, the start signal is configured to start the automatic configuration of the headroom within the buffer for the port 502*a* on the networking device 502.

The method 1200 then proceeds to block 1206 where the second networking device transmits worst-case data packet size data packets at maximum speed to the first port on the first networking device. In an embodiment, at block 1206 and in response to receiving the start signal, the headroom-based result determination engine 204 in the headroom-based result determination subsystem 200 of the networking device 504 may perform data packet transmission operations 1304 that include transmitting worst-case data packet size data packets at a maximum packet rate for a link speed of the link (e.g., a "line rate" of the link between the port 504*a* on the networking device 504 and the port 502*a* on the networking device 502) using, for example a packet generator in the networking device 504, the headroom-based result determination subsystem 200 in the networking device 504, and/or other data packet transmission devices that would be apparent to one of skill in the art in possession of the present disclosure.

For example, the headroom-based result determination engine 204 in the networking device 504 may be configured to generate data packets that have data associated with a lossless data class and that are configured with the worst-case data packet size determined as discussed above, and transmit those data packets to the networking device 502 such that those data packets are transmitted at a maximum packet rate for a link speed of the link from the port 504*a* on the networking device 504 to the port 502*a* on the networking device 502. As such, the maximum speed at which the data packets are transmitted may be the maximum speed at which the port 504*a* on the networking device 504 is configured to transmit data, and/or the maximum speed at which the port 502*a* on the networking device 502 is configured to receive data. However, while a specific example of the receiving of data packets at the port 502*a* has been provided, one of skill in the art in possession of the present disclosure will appreciate how the port 502*a* may receive data in other manners that will fall within the scope of the present disclosure as well.

Figure 13D:
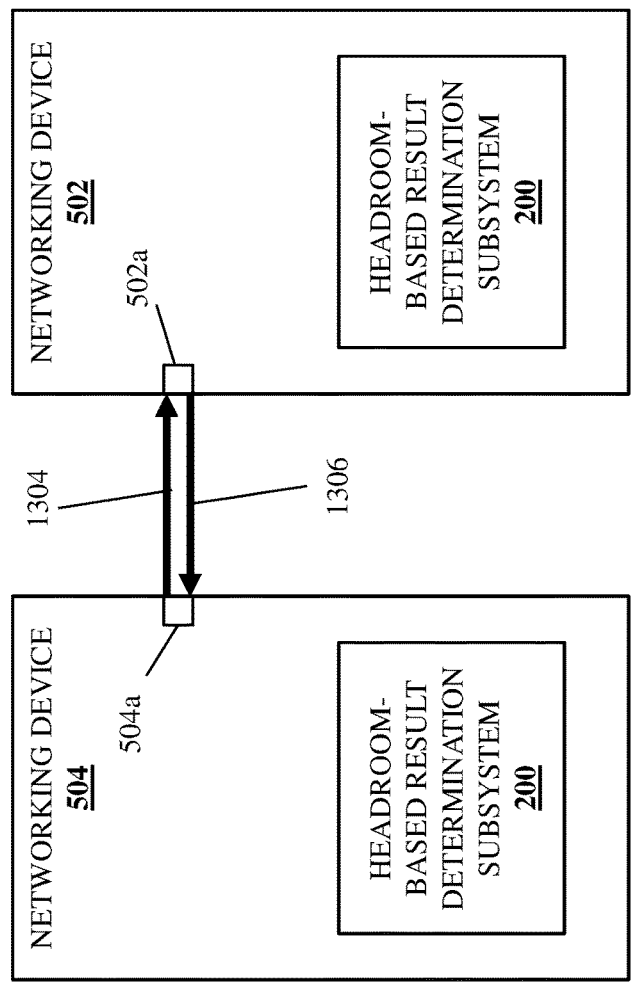
FIG. 13D is a schematic view illustrating an embodiment of the headroom-based result determination system of FIG. 5 operating during the method of FIG. 12.

The method 1200 then proceeds to block 1208 where the first networking device generates and transmits a data transmission pause instruction to the second networking device. With reference to FIG. 13D, in an embodiment of block 1208, the headroom-based result determination engine 204 in the headroom-based result determination subsystem 200 of the networking device 502 may perform data transmission pause instruction generation operations that include generating a data transmission pause instruction (e.g., a pause frame, a PFC communication, etc.), followed by data transmission pause instruction transmission operations 1306 that include transmitting the data transmission pause instruction via the port 502*a* and to the port 504*a* on the networking device 504. As will be appreciated by one of skill in the art in possession of the present disclosure, the data transmission pause instruction may be asserted throughout the remainder of the method 1200 following its transmission at block 1208.

In some embodiments, the generation and transmission of the data transmission pause instruction at block 1208 may be performed similarly as discussed above with reference to block 810 and in response to the headroom-based result determination engine 204 in the headroom-based result determination subsystem 200 of the networking device 502 determining that data stored in a buffer for the port 502a (and lossless class) on the networking device 502 has reached a buffer threshold. However, in other embodiments, the generation and transmission of the data transmission pause instruction at block 1208 may be performed by the headroom-based result determination engine 204 in the headroom-based result determination subsystem 200 of the networking device 502 at any time following the receiving of the data packets from the networking device 504 at the port 502a.

Figure 13E:
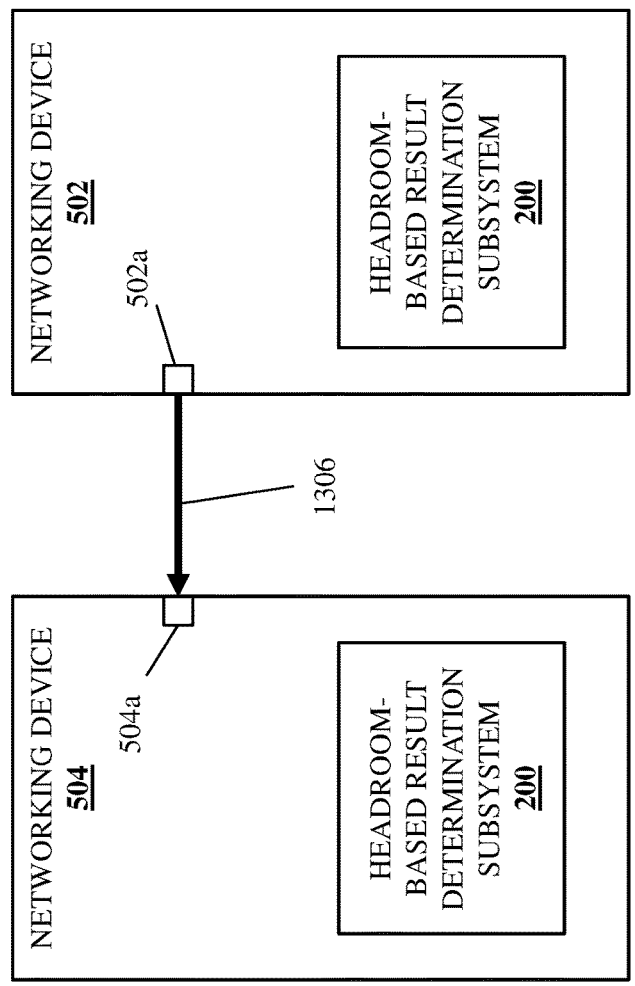
FIG. 13E is a schematic view illustrating an embodiment of the headroom-based result determination system of FIG. 5 operating during the method of FIG. 12.

The method 1200 then proceeds to block 1210 where a headroom-based result determination subsystem in the first networking device measures a first amount of data received at the first port subsequent to the generation of the data transmission pause instruction. In an embodiment, at block 1210 and following the generation of the data transmission pause instruction at block 1208, the headroom-based result determination engine 204 in the headroom-based result determination subsystem 200 of the networking device 502 may perform headroom data storage measurement operations that include measuring an amount of data that is received at its port 502a subsequent to the generation of the data transmission pause instruction. With reference to FIG. 13E, similarly as discussed above, data packets will stop being received via the port 502a on the networking device 502 subsequent to the generation of the data transmission pause instruction, and the headroom-based result determination engine 204 in the networking device 502 may measure the amount of data that was received via the port 502a subsequent to the generation of the data transmission pause instruction.

In some embodiments, the headroom data storage measurement operations may be performed similarly as discussed above with reference to block 812, with the headroom-based result determination engine 204 in the networking device 502 measuring the amount of data that was received and stored in the buffer for the port 502a subsequent to the generation of the data transmission pause instruction amount, i.e., data stored in the headroom within the buffer for the port 502a. For example, the headroom-based result determination engine 204 in the networking device 502 may utilize a latched counter such as a BST device to measure the amount of data stored in the headroom within the buffer for the port 502a, although other techniques for measuring buffer/headroom usage will fall within the scope of the present disclosure as well. Similarly as described above, this example assumes that the generation of the data transmission pause instruction occurs immediately in response to the buffer threshold of the buffer for the port 502a (and lossless class) being reached, and one of skill in the art in possession of the present disclosure will appreciate if delays exist between the buffer threshold of the buffer for the port 502a (and lossless class) being reached and the generation of the data transmission pause instruction, the measurement at block 1210 may be of the amount of data that was received and stored in the buffer for the port 502a subsequent to the buffer threshold of the buffer for the port 502a (and lossless class) being reached.

However, in other embodiments, the headroom data storage measurement operations may include the headroom-based result determination engine 204 in the networking device 502 measuring the amount of data that is received via the port 502a subsequent to the generation of the data transmission pause instruction amount, but without that data being stored in a buffer for the port 502a (e.g., counting the data packets received via the port 502a and then dropping or otherwise discarding those data packets).

The method 1200 then proceeds to block 1212 where the headroom-based result determination subsystem in the first networking device generates a headroom-based result by adding the first amount of data, a second amount of data equal to a maximum data packet transmission size of the first port, and a third amount of data equal to a maximum data packet transmission size of a class of the data in the data packets received at the first port. In an embodiment, at block 1212, the headroom-based result determination engine 204 in the headroom-based result determination subsystem 200 of the networking device 502 may perform headroom-based result generation operations that include generating a headroom-based result by adding the amount of data determined at block 1210, an amount of data equal to the maximum data packet transmission size (e.g., an MTU) of the port 502a on the networking device 502, and an amount of data equal to the maximum data packet transmission size of the class (e.g., an MTU of the lossless data class) of the data in the data packets transmitted via the port 504a of the networking device 504 to the port 502a of the networking device 502. As discussed above, MTUs may be converted to "cells" for headroom size determinations (and other similar headroom-based results), while not requiring conversion for purposes of headroom compliance of a device to delays per IEEE specifications (and other similar headroom-based results).

Similarly as discussed above, the headroom-based result generation operations take the packet boundary conditions discussed above into account when generating the headroom-based result, with the amount of data equal to the maximum data packet transmission size of the port 502a covering the situation in which a maximum size data packet must be transmitted via the port 502a prior to a data transmission pause instruction that was generated immediately prior to initiation of the transmission of that maximum size data packet, and the maximum data packet transmission size of the class of the data in the data packets transmitted from the port 504a to the port 502a covering the situation in which a maximum size data packet must be transmitted by the networking device 504 prior to pausing data transmissions at the port 504a.

As such, the headroom-based result may include a sum of 1) an amount of bytes of data stored in the headroom within the buffer for the port 502a or received via the port 502a subsequent to generating the data transmission pause instruction. 2) an amount of bytes of data in a maximum sized data packet that may be transmitted by the port 502a, 3) an amount of bytes of data in a maximum sized data packet that may be transmitted by the networking device 504 to the port 502a. At or following block 1212, that sum may be used to configure a worst-case headroom size (e.g., a number of bytes) for the headroom within the buffer for the port 502a, and/or for a variety of other headroom-based results that would be apparent to one of skill in the art in possession of the present disclosure.

Figure 13F:
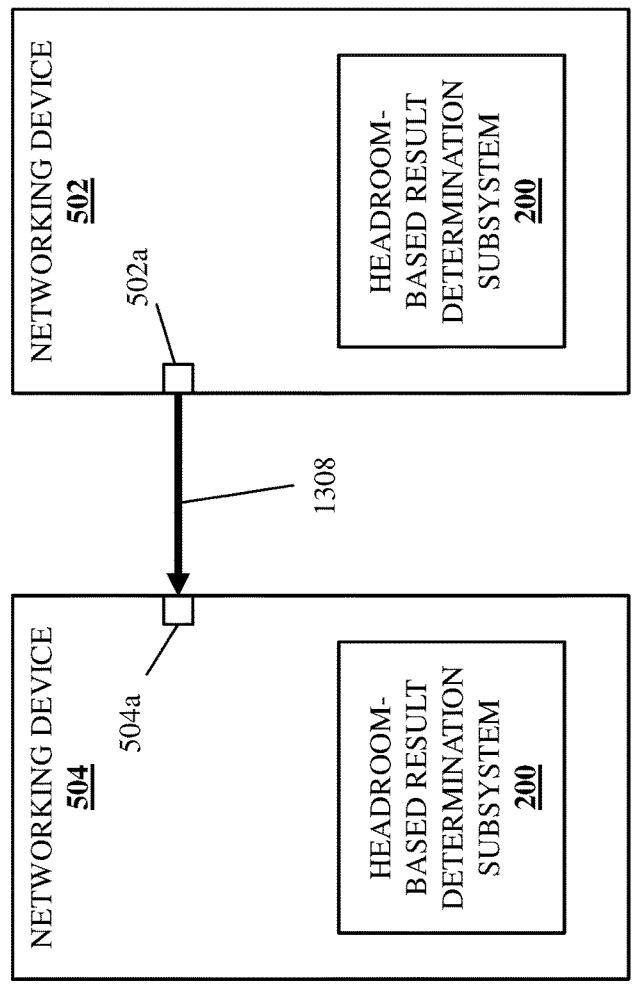
FIG. 13F is a schematic view illustrating an embodiment of the headroom-based result determination system of FIG. 5 operating during the method of FIG. 12.

With reference to FIG. 13F, following block 1212, the networking device 502 may perform stop signal transmission operations 1308 that may include generating and transmitting a stop signal via its port 502a to the networking device 504 via its port 504a, with the stop signal configured to indicate that the automatic configuration of the headroom within the buffer for the port 502a on the networking device 502 has completed. In addition, the networking device 502 may de-assert the data transmission pause instruction (e.g., by sending a pause frame, PFC communication, or other data transmission pause instruction time of zero).

As discussed above, the headroom-based result determination system 500 and method 1200 may be used to automatically configure the headroom within buffers for ports on each side of a link, and may be particularly useful for non-standard situations such as, for example, when data transmission shaping is used at either end of the link to modify data transmission speeds, and which one of skill in the art in possession of the present disclosure will recognize operates to reduce buffer headroom requirements.

In another example, the headroom-based result determination system 500 and method 1200 may be used in situations such as Data Center Interconnect (DCI) environments where the link between the ports 502*a* and 504*a* is too long to allow the networking devices 502 and 504 to provide sufficient headroom within the buffer when data packets are transmitted at maximum data packet transmission rates. In such a situation, a network administrator or other user may configure the buffers for the ports 502*a* and 504*b* with a maximum headroom they wish to allocate, and the method 1200 may be performed to determine whether that amount of buffer headroom is sufficient. In the event the method 1200 determines the amount of headroom allocated for the buffer of a port is too much, the headroom size may be reduced to the amount determined using the method 1200. In the event the method 1200 determines the amount of buffer allocated to the headroom within the buffer of a first port is too little, data transmission shaping may be used at the second port opposite the link from the first port to reduce the data transmission speed and thus the buffer headroom needed for the buffer of the first port to the amount determined using the method 1200. In yet another example, the method 1200 may be repeatedly performed with different data transmission shaping used at the second port opposite the link from the first port to adjust the data transmission speed until the headroom needed for the first port is equal to or less than the amount determined using the method 1200.

Thus, systems and methods have been described that provide for the determination of a headroom-based result that is based on a measurement of a first amount of buffer usage subsequent to the generation of a data transmission pause instruction for a first port, a maximum data packet transmission size of the first port, and a maximum data packet transmission of a class of data received at the first port. For example, the headroom-based result determination system of the present disclosure may include first and second ports connected via a link, and a buffer for the first port. A headroom-based result determination subsystem monitors data stored in the buffer that was received in data packets each having a worst-case data packet size and transmitted at a maximum packet rate for a link speed of the link, determines that a buffer threshold is reached and, in response, generates a pause instruction. The headroom-based result determination subsystem then transmits the pause instruction to the second port, measures a first amount of data stored in the buffer subsequent to generating the pause instruction, and generates a headroom-based result by adding the first amount of data, a second amount of data equal to a maximum transmission size of the first port, and a third amount of data equal to a maximum transmission size of a class of the data received at the first port. As such, headroom size and other headroom-based results may be determined without the issues associated with conventional headroom size determinations discussed above, and without the need to determine medium delays cause by cable/link lengths, MAC/PHY delays, higher layer delays, or the use of optional features such as FEC and MACsec.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A headroom-based result determination system, comprising:
a second port;
a first port that is connected to the second port via a link;
a buffer associated with the first port; and
a headroom-based result determination subsystem that is coupled to the first port and that configured to:
monitor data stored in the buffer in response to the first port receiving, from the second port, the data in data packets that each have a worst-case data packet size and that are transmitted via the link at a maximum packet rate for a link speed of the link;
determine that the data stored in the buffer has reached a buffer threshold and, in response, generate a data transmission pause instruction;
transmit, through the first port and via the link, the data transmission pause instruction to the second port;
measure a first amount of data that is received and stored in the buffer subsequent to generating the data transmission pause instruction; and
generate a headroom-based result by adding the first amount of data, a second amount of data equal to a maximum data packet transmission size of the first port, and a third amount of data equal to a maximum data packet transmission size of a class of the data that is included in the data packets received at the first port.

2. The system of claim 1, wherein the headroom-based result includes a size of a headroom provided in the buffer.

3. The system of claim 1, wherein the headroom-based result includes a reaction time for the second port.

4. The system of claim 1, wherein the headroom-based result includes a link transmission speed for the link that will not use up a headroom provided in the buffer.

5. The system of claim 1, wherein the headroom-based result determination subsystem is included in a networking device that includes the first port, and wherein the second port is included in a second networking device.

6. The system of claim 1, wherein the headroom-based result determination subsystem is included in a testing device that includes the first port, and wherein the second port is included in a networking device.

7. An Information Handling System (IHS), comprising:
a processing system; and
a memory system that is coupled to the processing system and that includes instructions that, when executed by the processing system, cause the processing system to provide a headroom-based result determination engine that is configured to:
monitor data stored in a buffer associated with a first port in response to the first port receiving, from a second port that is coupled to the first port via a link, the data in data packets that each have a worst-case data packet size and that are transmitted via the link at a maximum packet rate for a link speed of the link;

determine that the data stored in the buffer has reached a buffer threshold and, in response, generate a data transmission pause instruction;

transmit, through the first port and via the link, the data transmission pause instruction to the second port;

measure a first amount of data that is received and stored in the buffer subsequent to generating the data transmission pause instruction; and generate a headroom-based result by adding the first amount of data, a second amount of data equal to a maximum data packet transmission size of the first port, and a third amount of data equal to a maximum data packet transmission size of a class of the data that is included in the data packets received at the first port.

8. The IHS of claim 7, wherein the headroom-based result includes a size of a headroom provided in the buffer.

9. The IHS of claim 8, wherein the size of the headroom provided in the buffer is measured in buffer cells.

10. The IHS of claim 7, wherein the headroom-based result includes a reaction time for the second port.

11. The IHS of claim 7, wherein the headroom-based result includes a link transmission speed for the link that will not use up a headroom provided in the buffer.

12. The IHS of claim 7, wherein the processing system and the memory system are included in a networking device that includes the first port, and wherein the second port is included in a second networking device.

13. The IHS of claim 7, wherein the processing system and the memory system are included in a testing device that includes the first port, and wherein the second port is included in a networking device.

14. A method for determining headroom-based results, comprising:

monitoring, by a headroom-based result determination subsystem, data stored in a buffer associated with a first port in response to the first port receiving, from a second port that is coupled to the first port via a link, the data in data packets that each have a worst-case data packet size and that are transmitted via the link at a maximum packet rate for a link speed of the link;

determining, by the headroom-based result determination subsystem, that the data stored in the buffer has reached a buffer threshold and, in response, generate a data transmission pause instruction;

transmitting, by the headroom-based result determination subsystem through the first port and via the link, the data transmission pause instruction to the second port;

measuring, by the headroom-based result determination subsystem, a first amount of data that is received and stored in the buffer subsequent to generating the data transmission pause instruction; and generating, by the headroom-based result determination subsystem, a headroom-based result by adding the first amount of data, a second amount of data equal to a maximum data packet transmission size of the first port, and a third amount of data equal to a maximum data packet transmission size of a class of the data that is included in the data packets received at the first port.

15. The method of claim 14, wherein the headroom-based result includes a size of a headroom provided in the buffer.

16. The method of claim 15, wherein the size of the headroom provided in the buffer is measured in buffer cells.

17. The method of claim 14, wherein the headroom-based result includes a reaction time for the second port.

18. The method of claim 14, wherein the headroom-based result includes a link transmission speed for the link that will not use up a headroom provided in the buffer.

19. The method of claim 14, wherein the headroom-based result determination subsystem is included in a networking device that includes the first port, and wherein the second port is included in a second networking device.

20. The method of claim 14, wherein the headroom-based result determination subsystem is included in a testing device that includes the first port, and wherein the second port is included in a networking device.

* * * * *